(12) United States Patent
Kurokawa et al.

(10) Patent No.: US 8,916,310 B2
(45) Date of Patent: Dec. 23, 2014

(54) CONDUCTIVE SHEET AND PRODUCTION METHOD FOR SAME

(75) Inventors: Kazuma Kurokawa, Shizuoka (JP); Tetsuya Akamatsu, Shizuoka (JP)

(73) Assignee: Toho Tenax Co., Ltd., Tokyo (JP)

( * ) Notice: Subject to any disclaimer, the term of this patent is extended or adjusted under 35 U.S.C. 154(b) by 162 days.

(21) Appl. No.: 13/819,023

(22) PCT Filed: Aug. 24, 2011

(86) PCT No.: PCT/JP2011/069074
§ 371 (c)(1),
(2), (4) Date: Feb. 26, 2013

(87) PCT Pub. No.: WO2012/026498
PCT Pub. Date: Mar. 1, 2012

(65) Prior Publication Data
US 2013/0157171 A1    Jun. 20, 2013

(30) Foreign Application Priority Data

Aug. 27, 2010 (JP) ................................ 2010-191353
Apr. 5, 2011 (JP) ................................ 2011-083237
Aug. 12, 2011 (JP) ................................ 2011-176966

(51) Int. Cl.
*H01M 4/96* (2006.01)
*H01M 4/86* (2006.01)
*H01B 1/24* (2006.01)
*H01M 8/02* (2006.01)

(52) U.S. Cl.
CPC .............. *H01M 4/8605* (2013.01); *H01B 1/24* (2013.01); *H01M 8/0234* (2013.01); *H01M 8/0239* (2013.01); *H01M 8/0243* (2013.01); *H01M 8/0245* (2013.01); *H01M 4/8652* (2013.01); *Y02E 60/50* (2013.01)
USPC ....................................................... 429/484

(58) Field of Classification Search
None
See application file for complete search history.

(56) References Cited

U.S. PATENT DOCUMENTS

2002/0040090 A1* 4/2002 Kurasawa et al. ............ 524/496
2002/0175073 A1 11/2002 Nakamura et al.
(Continued)

FOREIGN PATENT DOCUMENTS

EP         1 139 471 A1    10/2001
JP         1994-203851 A   7/1994
(Continued)

OTHER PUBLICATIONS

International Search Report Dated Sep. 30, 2011, Mailed Oct. 11, 2011.

*Primary Examiner* — Patrick Ryan
*Assistant Examiner* — Wyatt McConnell
(74) *Attorney, Agent, or Firm* — Norris McLaughlin & Marcus PA

(57) ABSTRACT

A conductive sheet comprises an aromatic polyamide pulp, a fluoroplastic fused to the aromatic polyamide pulp, and a carbon-based conductive material; wherein the conductive sheet has a static contact angle of water on a first surface that is greater than the static contact angle of water on a second surface that in the opposite surface to the first surface, and the difference between the static contact angle of water on the first surface and the static contact angle of water on the second surface is 20°-180°; or wherein the injection pressure of water on the first surface of the conductive sheet is less than the injection pressure of water on the second surface that is the opposite surface to the first surface, and the difference between the injection pressure of water on the first surface and the injection pressure of water on the second surface is 20-50 kPa.

23 Claims, 2 Drawing Sheets

(56) References Cited

U.S. PATENT DOCUMENTS

| | | | |
|---|---|---|---|
| 2003/0180622 A1* | 9/2003 | Tsukuda et al. | 429/249 |
| 2005/0233200 A1* | 10/2005 | Miller | 429/38 |

FOREIGN PATENT DOCUMENTS

| | | |
|---|---|---|
| JP | 1995-220734 A | 3/1997 |
| JP | 1997-188767 A | 7/1997 |
| JP | 1997-213296 A | 8/1997 |
| JP | 2001-196085 A | 7/2001 |
| JP | 2002-164056 A | 6/2002 |
| JP | 2002-198023 A | 7/2002 |
| JP | 2003-213563 A | 7/2003 |
| JP | 2003-268651 A | 9/2003 |
| JP | 2004-079406 A | 3/2004 |
| JP | 2005-228755 A | 8/2005 |
| JP | 2006-294559 A | 10/2006 |
| JP | 2007-227009 A | 9/2007 |
| JP | 2008-034176 A | 2/2008 |
| JP | 2008-103142 A | 5/2008 |
| JP | 2008-186718 A | 8/2008 |
| JP | 2008-201005 A | 9/2008 |
| JP | 2008-204945 A | 9/2008 |
| JP | 2008-210725 A | 9/2008 |
| JP | 2010-153222 A | 7/2010 |
| JP | 2011-108438 A | 6/2011 |
| WO | 01/22509 A | 3/2001 |
| WO | 01/56103 A | 8/2001 |

* cited by examiner

CONDUCTIVE SHEET AND PRODUCTION METHOD FOR SAME

This application is a 371 application of PCT/JP2011/069074 filed Aug. 24, 2011, which claims foreign priority benefit under 35 U.S.C. §119 of Japanese application Nos. 2010-191353 filed Aug. 27, 2010, 2011-083237 filed Apr. 5, 2011 and 2011176966 filed Aug. 12, 2011.

TECHNICAL FIELD

The present invention relates to a conductive sheet and a method for producing the conductive sheet. More particularly, the present invention relates to a conductive sheet comprising a fluoroplastic and a conductive material, as well as to a method for producing the conductive sheet. The conductive sheet of the present invention is useful as an electrode material, particularly as an electrode material for fuel cell.

BACKGROUND ART

Fuel cell is divided into four kinds depending upon the kind of the electrolyte used therein, i.e. molten carbonate fuel cell (MCFC), solid oxide fuel cell (SOFC), phosphoric acid fuel cell (PAFC) and polymer electrolyte fuel cell (PEFC). Lately, development is under way for fuel cell using an enzyme or a microorganism as a catalyst, i.e. bio cell.

Single cell as a unit of polymer electrolyte fuel cell comprises a thin-sheet-shaped polymer electrolyte membrane and gas diffusion electrodes (each having a catalyst layer) laminated to each side of the polymer electrolyte membrane. Incidentally, the gas diffusion electrode having a catalyst layer is called membrane-electrode assembly (hereinafter may be referred also as "MEA"). The polymer electrolyte fuel cell has a stack structure in which a plurality of the above-mentioned single cells are laminated via separators. The polymer electrolyte membrane allows the selective permeation of hydrogen ion (proton). The above-mentioned catalyst layer is composed mainly of fine carbon particles supporting thereon a noble metal catalyst made of, for example, platinum. The above-mentioned gas diffusion electrode is required to have a gas-diffusing property of introducing a fuel gas and air into the catalyst layer and exhausting the formed gas and an excessive gas, a high conductivity of taking the generated electricity outside with no loss, and a durability to the strongly acidic atmosphere caused by the generated proton.

As the material for the gas diffusion electrode, there is used, in many cases, a carbon fiber sheet (e.g. carbon fiber cloth, carbon fiber felt or carbon fiber paper) because it is superior in mechanical properties, acid resistance and conductivity and is light.

For production of the carbon fiber sheet, the following methods are mentioned, for example. There is a method of producing a carbon fiber sheet by making a carbon fiber (e.g. filament yarn, staple yarn or cut fiber) into a sheet by weaving, sheeting or the like. Also, there is a method for producing a carbon fiber sheet by subjecting a flame-resistant fiber (a carbon fiber precursor) to sheeting and carbonizing the resulting sheet at a temperature of 1,000° C. or more (for example, Patent Literature 1). Further, there is a method for producing a carbon fiber sheet by mixing a carbon fiber and a binder for sheeting, subjecting the mixture to sheeting, impregnating the resulting sheet with a thermosetting resin (e.g. phenol), setting the impregnated resin, and then conducting carbonizing at a temperature of 1,000° C. or more (for example, Patent Literature 2).

The gas diffusion electrode is required to have a function of exhausting the water formed by electricity-generating reaction, to a separator. The reason is that, if the water stays in MEA, the feeding of fuel gas to catalyst layer is hindered (this phenomenon may be hereinafter called "flooding"). In order to promote the exhausting of the water formed by electricity-generating reaction to suppress the flooding, the carbon fiber sheet constituting the gas diffusion electrode is generally allowed to have hydrophobicity. For allowing the carbon fiber sheet have hydrophobicity, it is generally conducted to impregnate a conductive sheet (e.g. carbon fiber sheet) with a water-repellent material such as polytetrafluoroethylene (PTFE), polyvinylidene fluoride (PVDF) or the like and subjecting the resulting sheet to sintering at 200 to 500° C. (for example, Patent Literature 3).

The gas diffusion electrode is required to have a function of uniformly diffusing a fuel gas in the catalyst layer and a function of controlling the wetness inside MEA. When a fuel gas is uniformly diffused in the catalyst layer, the area of reaction between fuel gas and catalyst layer increases. Further, when the wetness inside MEA is controlled, the drying of polymer electrolyte membrane is suppressed and the electrical resistance of polymer electrolyte membrane decreases. As a result, a fuel cell constituted using this gas diffusion electrode can generate a high voltage.

In order to allow the gas diffusion electrode to have a function of uniformly diffusing a fuel gas, it is generally conducted to form a micro porous layer (MPL) on a carbon fiber sheet. This MPL is constituted by carbonaceous particles (e.g. carbon black) and a fluoroplastic and has pores of about several μm in average diameter. A carbon fiber sheet having a MPL, as compared with a carbon fiber sheet having no MPL, can diffuse a gas uniformly. Also, a carbon fiber sheet having a MPL can hold water and accordingly can control the wetness. The MPL is formed, for example, by spraying or knife-coating a slurry containing carbonaceous particles and a fluoroplastic at appropriate concentrations. The coating is conducted generally by coating on the surface of a carbon fiber sheet (for example, Patent Literature 4).

As described above, as the gas diffusion electrode for polymer electrolyte fuel cell, there is generally used a water-repellent conductive sheet produced by subjecting a carbon fiber sheet to a hydrophobicity treatment and then forming a MPL on the resulting sheet.

This water-repellent conductive sheet is in wide use as an electrode material not only for polymer electrolyte fuel cell but also for fuel cell (e.g. bio fuel cell or air zinc cell) required to have diffusibility of fuel gas or liquid fuel and water-exhausting property.

However, the water-repellent conductive sheet is produced via many steps as described previously and therefore is low in production efficiency. As a result, a fuel cell using the water-repellent conductive sheet as an electrode material is expensive. Various proposals were made for these problems.

In Patent Literature 5, there is described a method for producing an electrode material for fuel cell, which comprises immersing a base material made of a polyarylate non-woven fabric, in a slurry wherein a fluoroplastic and a carbon material (e.g. carbon black) are dispersed and then drying the resulting material.

In Patent Literature 6, there is described a method for producing an electrode material for fuel cell, which comprises adhering, to a base material made of a glass fiber non-woven fabric, an acrylic resin or a vinyl acetate resin, then coating thereon a conductive paste which is a mixture of PVDF or PTFE and carbon particles, with a solvent, and drying the resulting material.

The production methods described in Patent Literatures 5 and 6 are superior to conventional methods in production efficiency. However, in these methods, the conductivity of the polyarylate non-woven fabric or glass fiber non-woven fabric used as a base material is low and, therefore, a fuel cell using the electrode material has a high internal resistance. As a result, no high cell performance is obtained.

Also, various proposals were made for an electrode material for fuel cell, having conductivity and high productivity (for example, Patent Literature 7 and Patent Literature 8).

In Patent Literature 7, there is described an electrode material for fuel cell, wherein a metal mesh is coated with a noble metal to allow the metal mesh to have higher acid resistance. However, since the noble metal used for coating is expensive, the fuel cell obtained is expensive. A metal mesh not coated with any novel metal invites the deterioration of electrolyte membrane by the metal ion dissolving due to corrosion. Accordingly, the metal mesh is required to be subjected to an acid resistance treatment such as coating of noble metal.

In Patent Literature 8, there is described an electrode material for fuel cell, produced by coating, on a base material sheet [made of a woven or non-woven fabric composed of an inorganic fiber (e.g. glass fiber) or an organic fiber, or a metal mesh], a carbon fiber, carbon fine particles and a resin. This electrode material contains carbon fine particles between carbon fibers and therefore has high conductivity, as compared with the electrode materials described in Patent Literature 5 and Patent Literature 6. However, production of an electrode material of high conductivity makes it necessary to impregnate the inside of base sheet with sufficient amounts of carbon fiber and carbon fine particles. In order to impregnate the inside of base sheet with sufficient amounts of carbon fiber and carbon fine particles, a low-concentration resin solution (wherein a carbon fiber and carbon fine particles are dispersed) is coated on a base material sheet, followed by drying, and this operation is repeated until a desired impregnation amount is reached. However, this method repeats coating of resin solution and drying and therefore is low in production efficiency.

Various proposals were made for a water-repellent sheet produced by sheeting (i.e. papermaking). The sheet produced by sheeting is high in production efficiency. In Production Literature 9, there is described a method for producing a water-repellent sheet, which comprises dispersing an aromatic polyamide and fluoroplastic particles in water and subjecting the dispersion to sheeting. The sheet obtained by this method has no conductivity. Accordingly, a fuel cell using this sheet is low in cell performance.

Fuel cell is used under various electricity-generating conditions, depending upon the application and electricity-generating method. Therefore, the gas diffusion electrode constituting each fuel cell is required to exhibit high performance under various electricity-generating conditions. A high performance is required especially under low-temperature humidity conditions.

There is a water-repellent conductive sheet obtained by producing a carbon fiber sheet, subjecting the sheet to a water-repellent treatment, and forming thereon a MPL (for example, Patent Literature 4). This water-repellent conductive sheet is too high in the hydrophobicity of whole sheet. As a result, the polymer membrane is dried especially under low-temperature humidity conditions, resulting in reduced cell performance (this phenomenon may be hereinafter referred as "dry-out"). When lower hydrophobicity is employed in order to suppress the dry-out, flooding appears, resulting in reduced cell performance.

In order to have good performance under various humidity conditions, especially under low-temperature humidity conditions, the water content inside fuel cell need be controlled. Various proposals were made for this control (for example, Patent Literatures 10 and 11).

In Patent Literature 10, there is described a method for producing a porous carbon electrode base material, which comprises laminating conductive porous base materials of different water repellencies. However, this method employs complicated steps similarly to the above-mentioned Patent Literature 3 and is low in production efficiency. Also, the knot between layers invites a higher contact resistance and accordingly low cell performance. Further, water stays easily between layers, tending to cause a reduction in performance by flooding.

In Patent Literature 11, there is described a method for producing a sheet, which comprises spraying, by air, a carbon powder, a water-repellent resin powder and a carbon fiber on a gas-permeable sheet and then spraying thereon a carbon fiber and a water-repellent resin powder, to form a two-layered structure. However, containing no binder therein, the sheet has a low strength and is inferior in handling-ability, making difficult the assembling of cell. Also, in the spraying by air, the high stiffness of carbon fiber allow the first-layer sheet containing a carbon fiber to have a low bulk density. Accordingly, part of the carbon fiber and water-repellent resin powder (both are components of the second layer) is impregnated into the first layer, giving rise to large spots, resulting in low cell performance. Furthermore, it is impossible to produce a thin sheet.

CITATION LIST

Patent Literatures

Patent Literature 1: JP-A-2003-268651 (Claims)
Patent Literature 2: JP-A-2001-196085 (Claims)
Patent Literature 3: JP-A-1994-203851 (Claims)
Patent Literature 4: JP-A-1995-220734 (Claims)
Patent Literature 5: JP-A-2008-210725 (Claims)
Patent Literature 6: JP-A-2008-204945 (Claims)
Patent Literature 7: JP-A-2008-103142 (Claims)
Patent Literature 8: JP-A-2010-153222 (Claims)
Patent Literature 9: JP-A-1997-188767 (Claims)
Patent Literature 10: JP-A-2007-227009 (Claims)
Patent Literature 11: JP-A-2011-108438 (Claims)

SUMMARY OF INVENTION

Technical Problem

The first aim of the invention is to provide a water-repellent conductive sheet which solves the above-mentioned problems of the prior art, can be produced by sheeting, and is suitable as an electrode material for fuel cell, and a method for producing the conductive sheet.

The second aim of the present invention is to provide a conductive sheet which, when used in a fuel cell, shows a hydrophobicity of sufficiently exhausting the water formed in electricity-generating reaction and a water-holding property of preventing the dry-out of polymer electrolyte membrane, and a method for producing the conductive sheet.

The third aim of the present invention is to provide a conductive sheet which, when used in a fuel cell, shows a water-exhausting property of sufficiently exhausting the water formed in electricity-generating reaction and a water-blocking property of suppressing the penetration of water into gas diffusion layer (GDL) in order to prevent the dry-out of electrolyte membrane, and a method for producing the conductive sheet.

Solution to Problem

The present inventors found that a conductive sheet having hydrophobicity could be obtained by depositing, in a slurry using, as raw materials, an aromatic polyamide pulp, fluoroplastic particles and a carbon-based conductive material, the fluoroplastic particles on the aromatic polyamide pulp, subjecting the slurry to sheeting to obtain a conductive sheet precursor, then hot-pressing the conductive sheet precursor under given conditions, thereafter sintering the resulting sheet at a given temperature. The finding has led to the completion of the present invention.

The present inventors also found that a conductive sheet having very high gas permeability and very high water-exhausting property could be obtained by allowing the above-mentioned slurry to contain a material which decomposes at the sintering temperature employed for obtaining the conductive sheet. The finding has led to the completion of the present invention.

The present inventors further found that a conductive sheet having different water repellencies and different water-blocking properties between the two surfaces of the conductive sheet could be obtained by preparing at least two kinds of slurries different in the content of fluoroplastic by using, as raw materials, an aromatic polyamide pulp, fluoroplastic particles and a carbon-based conductive material, subjecting the slurries to multi-layer sheeting to obtain a conductive sheet precursor, and heat-treating the conductive sheet precursor under given conditions. The finding has led to the completion of the completion of the present invention.

The present invention which has achieved the above-mentioned tasks, is as described below.

[1] A conductive sheet characterized by comprising an aromatic polyamide pulp, a fluoroplastic fused to the aromatic polyamide pulp, and a carbon-based conductive material.

[2] The conductive sheet according to [1], wherein the carbon-based conductive material is at least one member selected from the group consisting of carbon fiber, carbon black, graphite particles, carbon nanotube, carbon milled fiber, carbon nanofiber, and carbon nanohorn.

[3] The conductive sheet according to [1], wherein the electrical resistance between the two surfaces is 6,500 mΩ/cm$^2$ or less and the static contact angle of water is 120° or more.

[4] A method for producing the conductive sheet according to [1], characterized by preparing a slurry containing an aromatic polyamide pulp, a fluoroplastic fused to the aromatic polyamide pulp, and a carbon-based conductive material, subjecting the slurry to sheeting to obtain a conductive sheet precursor, hot-pressing the conductive sheet precursor in air at a temperature of 120 to 250° C. at a contact pressure of 0.1 to 50 MPa for 1 to 300 minutes, then sintering the resulting conductive sheet in an inert gas of 200 to 500° C.

[5] A method for producing the conductive sheet according to [1], characterized by preparing a slurry containing an aromatic polyamide pulp, a fluoroplastic fused to the aromatic polyamide pulp, a carbon-based conductive material, and a material having a decomposition temperature in an inert atmosphere, lower by at least 30° C. than the sintering temperature in the sintering step conducted later, subjecting the slurry to sheeting to obtain a conductive sheet precursor, hot-pressing the conductive sheet precursor in air at a temperature of 120 to 250° C. at a contact pressure of 0.1 to 50 MPa for 1 to 300 minutes, then sintering the resulting conductive sheet in an inert gas of 200 to 500° C.

The inventions [6] to [25] described below were made based on the above inventions [1] to [5].

[6] A conductive sheet comprising an aromatic polyamide pulp, a fluoroplastic fused to the aromatic polyamide pulp, and a carbon-based conductive material, characterized in that the static contact angle of water on a first surface of the conductive sheet is larger than the static contact angle of water on a second surface opposite to the first surface and the difference between the water static contact angle on the first surface and the water static contact angle on the second surface is 20 to 180°.

[7] The conductive sheet according to [6], wherein the static contact angle of water on the first surface is 100 to 150°.

[8] The conductive sheet according to [6], wherein the static contact angle of water on the second surface is 50 to 130°.

[9] The conductive sheet according to [6], wherein the carbon-based conductive material is at least one member selected from the group consisting of carbon fiber, carbon black, graphite particles, carbon nanotube, carbon milled fiber, carbon nanofiber, carbon nanohorn, and graphene.

[10] The conductive sheet according to [6], wherein the electrical resistance between the two surfaces is 3,000 mΩ/cm$^2$ or less.

[11] The conductive sheet according to [6], having a layered structure of at least two layers in the thickness direction, wherein one outermost layer of the conductive sheet is a layer forming the first surface comprising 12.5 to 50 mass % of an aromatic polyamide pulp, 12.5 to 50 mass % of a fluoroplastic, and 0 to 75 mass % of a carbon-based conductive material, other outermost layer of the conductive sheet is a layer forming the second surface comprising 0 to 33 mass % of an aromatic polyamide pulp, 0 to 33 mass % of a fluoroplastic, and 34 to 100 mass % of a carbon-based conductive material, and the fluoroplastic content in the layer forming the first surface is higher than the fluoroplastic content in the layer forming the second surface.

[12] A method for producing the conductive sheet according to [6], which comprises preparing a slurry I comprising 12.5 to 50 mass % of an aromatic polyamide pulp, 0 to 75 mass % of a carbon-based conductive material and 12.5 to 50 mass % of a fluoroplastic deposited on the aromatic polyamide pulp, and a slurry II comprising a carbon-based conductive material and a fluoroplastic of zero content or a content lower than the fluoroplastic content in the slurry I, subjecting the slurry I and the slurry II to multi-layer sheeting to obtain a conductive sheet precursor, hot-pressing the conductive sheet precursor in air at a temperature of 120 to 250° C. at a contact pressure of 0.1 to 100 MPa for 1 to 300 minutes, then sintering the resulting conductive sheet in an inert gas of 200 to 500° C.

[13] A conductive sheet comprising an aromatic polyamide pulp, a fluoroplastic fused to the aromatic polyamide pulp, and a carbon-based conductive material, characterized in that the injection pressure of water on a first surface of the conductive sheet is smaller than the injection pressure of water on a second surface opposite to the first surface and the difference between the injection pressure of water on the first surface and the injection pressure of water on the second surface is 20 to 50 kPa.

[14] The conductive sheet according to [13], wherein the injection pressure of water on the first surface is 1 kPa or more.

[15] The conductive sheet according to [13], wherein the injection pressure of water on the second surface is 20 to 50 kPa.

[16] The conductive sheet according to [13], wherein the carbon-based conductive material is selected from the group consisting of graphite particles, carbon black, carbon nanotube, carbon fiber, carbon milled fiber, carbon nanofiber, carbon nanohorn, and graphene.

[17] The conductive sheet according to [13], wherein the electrical resistance between the two surfaces is 3,000 m$\Omega$/cm$^2$ or less.

[18] The conductive sheet according to [13], having a layered structure of at least two layers in the thickness direction, wherein one outermost layer of the conductive sheet is a layer forming the first surface comprising 0 to 45 mass % of an aromatic polyamide pulp, 1 to 45 mass % of a fluoroplastic, and 10 to 99 mass % of a carbon-based conductive material, and other outermost layer of the conductive sheet is a layer forming the second surface comprising 0 to 30 mass % of an aromatic polyamide pulp, 10 to 50 mass % of a fluoroplastic, and 20 to 90 mass % of a carbon-based conductive material.

[19] The conductive sheet according to [18], wherein the content of the fluoroplastic of the layer forming the second surface is higher than the content of the fluoroplastic of the layer forming the first surface.

[20] The conductive sheet according to [18], wherein the content of the carbon-based conductive material of the layer forming the second surface is higher than the content of the carbon-based conductive material of the layer forming the first surface.

[21] The conductive sheet according to [18], wherein the carbon-based conductive material of the layer forming the first surface is different from the carbon-based conductive material of the layer forming the second surface.

[22] A method for producing the conductive sheet according to [13], which comprises preparing a slurry I comprising 0 to 45 mass % of an aromatic polyamide pulp, 1 to 45 mass % of a fluoroplastic and 10 to 99 mass % of a carbon-based conductive material, and a slurry II comprising 0 to 30 mass % of an aromatic polyamide pulp, 10 to 50 mass % of a fluoroplastic and 20 to 90 mass % of a carbon-based conductive material, subjecting the slurry I and the slurry II to multi-layer sheeting to obtain a conductive sheet precursor, hot-pressing the conductive sheet precursor in air at a temperature of 120 to 250° C. at a contact pressure of 0.1 to 100 MPa for 1 to 300 minutes, then sintering the resulting conductive sheet in an inert gas of 200 to 500° C.

[23] An electrode material using the conductive sheet according to any of [1], [6] and [13].

[24] A fuel cell which is a laminate of
an electrode material using the conductive sheet according to any of [1], [6] and [13], and
an electrolyte membrane.

[25] A fuel cell which is a laminate of
an electrode material using the conductive sheet according to [6] or [13], and
an electrolyte membrane, wherein the electrode material is laminated to the electrolyte membrane in such a way that the second surface of the conductive sheet faces the electrolyte membrane.

Effects of Invention

The conductive sheet of the first embodiment of the present invention has conductivity and gas diffusibility and can be suitably used as an electrode material for fuel cell. This sheet further has hydrophobicity; therefore, the electrode constituted using the conductive sheet has superior water-exhausting property.

The conductive sheet of the second embodiment of the present invention has hydrophobicity and water-holding property. Therefore, the sheet enables appropriate water control of MEA. The fuel cell using the conductive sheet as an electrode material exhibits good cell property especially under low-temperature humidity conditions.

The conductive sheet of the third embodiment of the present invention has different injection pressures of water on the two surfaces. When the conductive sheet is laminated to an electrolyte membrane in such a way that the surface of the sheet having a higher injection pressure of water faces the electrolyte membrane, the penetration of reaction water from the electrolyte membrane into the GDL can be suppressed. Thereby, appropriate water control of the electrolyte membrane is possible and the dry-out of the electrolyte membrane can be prevented especially under low-temperature humidity conditions. Accordingly, the conductive sheet is suitable as an electrode material for fuel cell, especially as an electrode material for polymer electrolyte fuel cell. The conductive sheet of the present invention can be produced in one piece by sheeting and therefore is high in productivity.

Figure 1:
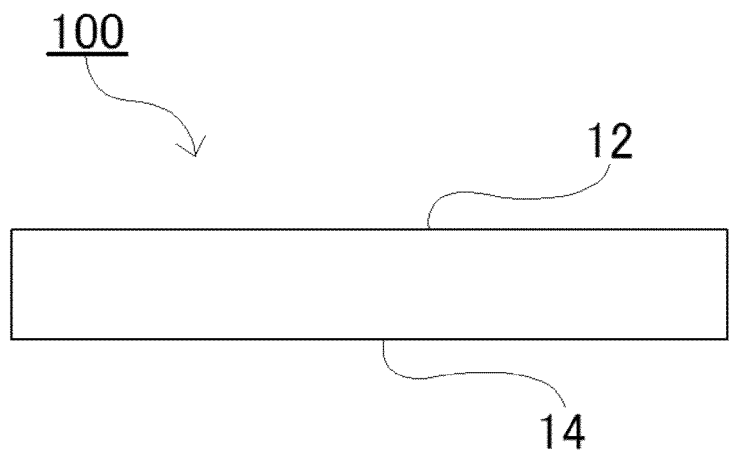
FIG. 1 is a side view showing an example of the conductive sheets of the second and third embodiments of the present invention.

REFERENCE SIGNS LIST 100 is a conductive sheet; 12 is a first surface; 14 is a second surface; 22 is a layer forming a first surface; 24 is a layer forming a second surface; 26 is an intermediate layer; 2 is a fibrillated aromatic polyamide pulp; 4 is a trunk portion; and 6 is a fibril portion.

DESCRIPTION OF EMBODIMENTS

First Embodiment

The first embodiment of the present invention is explained below.
(Conductive Sheet)

The conductive sheet of the first embodiment of the present invention (hereinafter, this sheet may be referred as "present conductive sheet") is constituted by comprising an aromatic polyamide pulp, a fluoroplastic and a carbon-based conductive material. The fluoroplastic is fused to the fiber surface of the aromatic polyamide pulp. The fluoroplastic allows the present conductive sheet to have hydrophobicity. The carbon-based conductive material is dispersed between the fibers of the aromatic polyamide pulp. The carbon-based conductive material allows the present conductive sheet to have conductivity in the thickness direction of the sheet.

The thickness of the present conductive sheet is preferably 50 to 500 μm, particularly preferably 100 to 400 μm. With a thickness of smaller than 50 μm, the sheet has a low strength, making difficult the handling of the sheet. With a thickness of larger than 500 μm, the sheet tends to have a non-uniform thickness.

The thickness of the present conductive sheet can be controlled by basis weight, of the sheet and the temperature and pressure employed in hot pressing (described later).

Basis weight, of the present conductive sheet is preferably 30 to 200 g/m$^2$, more preferably 50 to 150 g/m$^2$. With a basis weight, of smaller than 30 g/m$^2$, the sheet has a low strength, making difficult the handling of the sheet. With a basis weight, of larger than 200 g/m$^2$, it is difficult to obtain a sheet of intended thickness.

The bulk density of the present conductive sheet is preferably 0.2 to 0.7 g/cm$^3$. With a bulk density of smaller than 0.2 g/cm$^3$, the sheet has a low strength, making difficult the handling of the sheet. With a bulk density of larger than 0.7 g/cm$^3$, the sheet tends to have a non-uniform thickness.

The present conductive sheet has therein pores formed by the voids present between the aromatic polyamide pulp, the fluoroplastic, the carbon-based conductive material, etc. Further, the sheet has voids caused by a disappearing material (described later).

The average pore diameter of the present conductive sheet is preferably 0.1 to 20 μm, more preferably 0.1 to 10 μm. With an average pore diameter of smaller than 0.1 μm, the sheet has insufficient water-exhausting property. In an electrode using such a sheet, the water formed during electricity generation tends to stay. As a result, a reduced cell performance is invited. With an average pore diameter of larger than 20 μm, the diffusibility of fuel gas or liquid fuel is poor, reducing the cell performance.

The gas permeability of the present conductive sheet is preferably 3 ml/min.·cm$^2$ or more, more preferably 5 ml/min.·cm$^2$ or more. With an gas permeability of lower than 3 ml/min.·cm$^2$, the diffusibility of fuel gas or liquid fuel is poor, reducing the cell performance.

The static contact angle of the present conductive sheet is preferably 120° or more.

The electrical resistance between surfaces, of the present conductive sheet is preferably 6,500 mΩ/cm$^2$ or less, particularly preferably 4,000 mΩ/cm$^2$ or less. An electrical resistance of larger than 6,500 mΩ/cm$^2$ reduces the cell performance. With a fuel cell constituted by using such a sheet as an electrode material, no high electricity-generating performance is obtained.

(Aromatic Polyamide Pulp)

The aromatic polyamide pulp used in the present invention (this pulp may be hereinafter referred as "aramid pulp") is an aromatic polyamide pulp wherein at least 85% of the amide bond is an amide bond formed by the dehydration and condensation between aromatic diamine component and aromatic dicarboxylic acid component.

Figure 3:
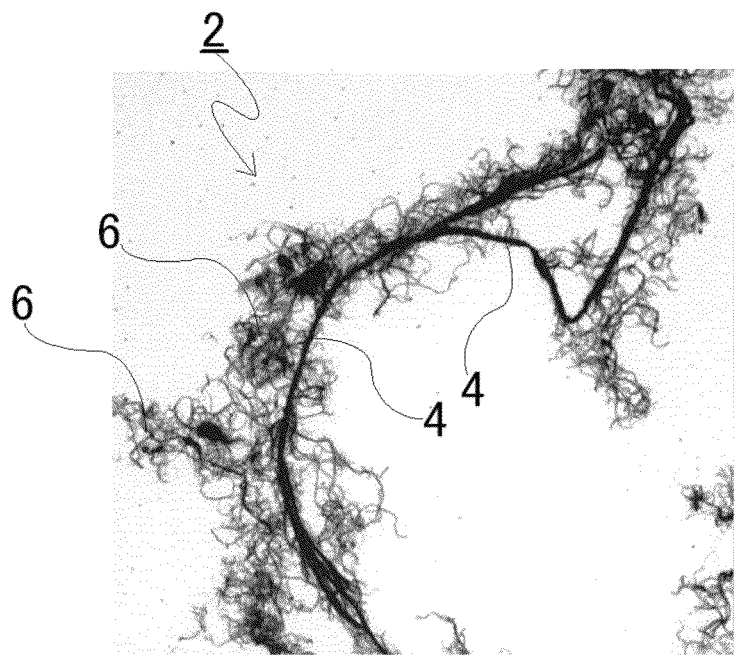
FIG. 3 is a photograph as a substitute for drawing, showing a fibrillated aromatic polyamide pulp.

In the aramid pulp used in the present invention, it is preferred that the fibers are fibrillated highly. FIG. 3 is a photograph as a substitute for drawing, showing a fibrillated aramid pulp. In FIG. 3, 2 is a fibrillated aramid pulp. The aromatic polyamide pulp 2 consists of trunk portions 4 and fibril portions 6 formed by fibrillation of trunk portion fibers.

The trunk portion 4 has a fiber diameter of 3 to 70 μm and a length of 1 to 500 mm. The fibril portion 6 has a fiber diameter of 0.01 to 2 μm.

As the aramid, there are mentioned, for example, polyparaphenylene terephthalamide, copolyparaphenylene-3,4'-oxydiphenylene-terephthalamide, polymetaphenylene isophthalamide, polyparabenzamide, poly-4,4'-diaminobenzanilide, polyparaphenylene-2,6-naphthalicamide, copolyparaphenylene/4,4'-(3,3'-dimethylbiphenylene)terephthalamide, polyorthophenylene terephthalamide, polyparaphenylene phthalamide, and polymetaphenylene isophthalamide.

Fibrillation refers to a method for forming fine short fibers randomly on the surface of a fiber. In the present invention, the fibrillation of the aramid pulp is conducted by a known method. For example, it is conducted by, as described in JP-B-1960-11851, JP-B-1962-5732, etc., adding a precipitating agent to an organic polymer solution and mixing them in a shear-applied system. It is also conducted by, as described in JP-B-1984-603, applying a mechanical shear (e.g. beating) to a shaped material having molecular orientation (formed from a solution of an optically anisotropic polymer), to form fine short single fibers randomly.

The average fiber length of the aramid pulp used in the present invention is preferably 0.1 to 100 mm, more preferably 0.5 to 10 mm, particularly preferably 0.5 to 5 mm.

BET specific surface area is used as an index for fibrillation. The specific surface area of the aramid pulp is preferably 3 to 25 m$^2$/g, more preferably 5 to 20 m$^2$/g, particularly preferably 9 to 16 m$^2$/g. When the aramid pulp has a BET specific surface area of smaller than 3 m$^2$/g, there is no sufficient entanglement between pulps. As a result, the sheet obtained is low in mechanical strengths. Further, the deposition of fluoroplastic particles on pulp surface (described later) is difficult. When the aramid pulp has a BET specific surface area exceeding 25 m$^2$/g, the water drainability during sheeting is low. As a result, a long time is needed for sheeting, leading to an increased production cost.

(Fluoroplastic)

As the fluoroplastic used in the present invention, there are mentioned, for example, polytetrafluoroethylene (hereinafter abbreviated as "PTFE"), perfluoroalkoxy resin (hereinafter abbreviated as "PFA"), fluorinated ethylene-propylene copolymer (hereinafter abbreviated as "FEP"), ethylene-tetrafluoroethylene copolymer (hereinafter abbreviated as "ETFE"), polyvinylidene fluoride (hereinafter abbreviated as "PVDF"), and polychloro trifluoroethylene (hereinafter abbreviated as "PCTFE"). PTFE is particularly preferred because it is superior in heat resistance and sliding property.

The average particle diameter of the fluoroplastic particles is preferably 0.01 to 10 μm, particularly preferably 0.1 to 1 μm. With an average particle diameter of smaller than 0.01 μm, the fluoroplastic particles hardly deposit on the surface of the aramid pulp. Meanwhile, with an average particle diameter exceeding 10 μm, it is difficult to prepare a stable dispersion of fluoroplastic particles. Therefore, the fluoroplastic tends to be present unevenly in the sheet.

(Carbon-Based Conductive Material)

The carbon-based conductive material used in the present invention is a material having a carbon content of at least 94 mass % and a specific resistance of 100 Ω·cm or less. As the carbon-based conductive material, there are mentioned, for example, carbon fiber, carbon black, graphite particles, carbon nanotube, carbon milled fiber, carbon nanofiber and carbon nanohorn. These may be used singly or in combination of two or more kinds.

As the carbon fiber and carbon milled fiber, there are mentioned, for example, PAN-based carbon fiber, pitch-based carbon fiber and phenol-based carbon fiber. Of these, PAN-based carbon fiber is particularly preferred.

When the carbon fiber or carbon milled fiber is used, the fiber diameter is preferably 5 to 20 µm, particularly preferably 6 to 13 µm. Incidentally, in the case of a carbon fiber having a flat sectional shape, the average of the long diameter and the short diameter is taken as the fiber diameter. When the fiber diameter is smaller than 5 µm, each single fiber has a low strength and, therefore, the sheet obtained tends to have an insufficient strength. Further, the carbon fiber detached from the sheet may give adverse effect on human body. When the fiber diameter exceeds 20 µm, the peripheral shape of each carbon single fiber constituting the sheet appears on the sheet surface. As a result, the sheet surface becomes uneven, reducing the surface smoothness of the sheet. Further, the unevenness formed on the sheet surface increases the contact electrical resistance of the sheet, making the sheet unsuitable as an electrode material. Furthermore, the fiber strength decreases during the sintering of the conductive sheet precursor, generating a large amount of a fine powder of carbon fiber.

The average length (cut length) of the carbon fiber or carbon milled fiber is preferably 20 mm or less. When the average length exceeds 20 mm, the uniform dispersibility of the fiber is low and the sheet obtained tends to have an insufficient strength.

The carbon content of the carbon fiber or carbon milled fiber is preferably at least 94 mass %. With a carbon content of lower than 94 mass %, the sheet obtained has a lower conductivity. Further, when the sheet is assembled into a cell and the cell is operated over a long period, the sheet tends to cause deterioration.

As the carbon black, there are mentioned, for example, acetylene black and Ketjen Black (registered trade mark) having a hollow shell structure. Ketjen Black is particularly preferred.

The average particle diameter of the carbon black is preferably 0.5 to 20 µm. With an average particle diameter of smaller than 0.5 µm, flocculation of carbon black particles tends to occur in preparing a dispersion of carbon black. With an average particle diameter exceeding 20 µm, there is no penetration of carbon-based conductive material into the inner part of the sheet, resulting in a sheet of low conductivity.

As the graphite particles, there are mentioned, for example, flaky graphite, scaly graphite, amorphous graphite, artificial graphite, expansive graphite, expanded graphite, foliaceous graphite, vein graphite and spheroidal graphite. Spheroidal graphite and flaky graphite are particularly preferred. The average diameter of graphite particles is preferably 0.05 to 300 µm.

(Material Decomposing at the Sintering Temperature or Lower)

The material decomposing at the sintering temperature or lower (hereinafter this material may be referred as "disappearing material") is a material which has a decomposition temperature of lower than 500° C. in an inert atmosphere and which decomposes and disappears at a temperature not higher than the sintering temperature (described later). The disappearing material is appropriately selected depending upon the sintering temperature employed. There is preferred an organic material having a pulp shape or a fiber shape which shows a good yield in the sheeting step and has a low decomposition temperature. As the disappearing material, there is mentioned, for example, a cellulose pulp such as wood pulp, liter pulp or the like. The disappearing material preferably has a length of 0.1 to 100 mm and a diameter of 0.1 to 50 µm.

The disappearing material decomposes and disappears in the sintering step, and forms voids in the present conductive sheet. The present conductive sheet, when the disappearing material is compounded therein, is high in gas permeability, water-exhausting property and gas diffusibility.

The disappearing material preferably has a decomposition temperature lower than the sintering temperature by at least 30° C. When the disappearing material has a decomposition temperature lower than the sintering temperature by less than 30° C., the disappearing material not decomposed in the sintering step tends to remain in the sheet; in this case, the sheet obtained is unable to show sufficiently high gas permeability, water-exhausting property and gas diffusibility.

(Method for Production of Present Conductive Sheet)

There is no particular restriction as to the method for producing the present conductive sheet. The present conductive sheet can be produced, for example, by the following method.

First, there is prepared a liquid in which an aromatic polyamide pulp (hereinafter may be referred as "aramid pulp") and fluoroplastic particles are dispersed (hereinafter, the liquid may be referred as "aramid pulp-fluoroplastic dispersion"). The aramid pulp-fluoroplastic dispersion is prepared by preparing an aramid pulp dispersion and a fluoroplastic particles dispersion separately and then mixing these dispersions. The aramid pulp-fluoroplastic dispersion is also prepared by adding an aramid pulp into a fluoroplastic particles dispersion and obtaining a mixed dispersion. An operation opposite in the order of addition is possible. Most preferred of these preparation methods is a method of adding an aramid pulp into a fluoroplastic particles dispersion and obtaining a mixed dispersion.

The compounding ratio of the aramid pulp and the fluoroplastic is selected appropriately depending upon the final product intended. The aramid pulp/fluoroplastic (mass ratio) is preferably 10/90 to 50/50, particularly preferably 20/80 to 40/60. When the aramid pulp/fluoroplastic is lower than 10/90, the reinforcement of sheet by aramid pulp is insufficient. Meanwhile, when the aramid pulp/fluoroplastic is higher than 50/50, the hydrophobicity of sheet by fluoroplastic is insufficient.

The dispersion of fluoroplastic particles can be prepared by a known method. For example, it can be prepared by radical-polymerizing raw material monomers for fluoroplastic in the presence of a surfactant. Or, a commercially available dispersion of fluoroplastic particles can be used per se. As the commercially available dispersion of fluoroplastic particles, there are mentioned, for example, Fluon PTFE Dispersion AD911L (product name) produced by Asahi Glass Co., Ltd. And Polyflon PTFE D-1E (product name) produced by Daikin Industries, Ltd.

The dispersing medium used is preferably water.

The dispersion of fluoroplastic particles is subjected to dispersion breakage (described later) in the later step. A dispersion of fluoroplastic particles, formed by using an ionic surfactant is subjected to dispersion breakage more easily than a dispersion of fluoroplastic particles, formed by using a non-ionic surfactant. However, the dispersion of fluoroplastic particles, formed by using an ionic surfactant, when subjected to dispersion breakage, tends to form large flocks of fluoroplastic particles. When large flocks of fluoroplastic particles are formed, it is difficult to obtain a sheet uniformly impregnated with a fluoroplastic. Meanwhile, the dispersion of fluoroplastic particles, formed by using a non-ionic surfactant is difficult to subject to dispersion breakage. However, when the dispersion can be subjected to dispersion breakage, it is possible to deposit fine fluoroplastic particles uniformly on the fiber surface of aramid pulp. For this reason, in the present invention, the dispersion of fluoroplastic particles, formed by using a non-ionic surfactant is used preferably.

The method of dispersing an aramid pulp is also known. For example, the dispersion method conventionally used in sheeting of wood pulp can be used per se. An aramid pulp can be dispersed using a disintegrator (pulper), a beater (e.g. Niagara beater), or a refiner (e.g. single disc refiner).

The dispersing medium used is preferably water.

In the present invention, the above-mentioned dispersion of fluoroplastic particles and the above-mentioned dispersion of aramid pulp are mixed, whereby an aramid pulp-fluoroplastic dispersion can be prepared. The mixing of the dispersion of aramid pulp and the dispersion of fluoroplastic gives rise to flocculation of fluoroplastic particles, whereby the fluoroplastic particles are deposited on the surface of the aramid pulp.

The method for preparation of the aramid pulp-fluoroplastic dispersion is not restricted to the above-mentioned method. For example, an aramid pulp and a fluoroplastic may be simultaneously dispersed in a medium, using various known methods. Or, they may be dispersed using a medium in which a carbon-based conductive material (described later) is dispersed.

The concentration of aramid pulp or fluoroplastic in the aramid pulp-fluoroplastic dispersion is not restricted particularly. A concentration which is as high as possible as long as the fluidity of aramid pulp-fluoroplastic dispersion is not impaired, is preferred in view of the production cost.

Next, a flocculating agent may be added to the dispersion in order to effectively flocculate the fluoroplastic particles on the surface of aramid pulp. With the addition of the flocculating agent, the fluoroplastic particles in aramid pulp-fluoroplastic dispersion lose stability in the dispersion. With the addition of the flocculating agent to the aramid pulp-fluoroplastic dispersion, the fluoroplastic particles lose stability in the dispersion and cause flocculation, and the particles are deposited easily on the fiber surface of aramid pulp in the form of particles. The kind and amount of the flocculating agent used is appropriately determined depending upon the kind of the surfactant used for dispersion of fluoroplastic particles and the specific surface area of the aramid pulp used.

When the fluoroplastic particles are dispersed in the aramid pulp-fluoroplastic dispersion by using an anionic surfactant, there is used, as the flocculating agent, a strong acid, a strong electrolyte, a polyacrylamide type flocculating agent, or a polymer (e.g. polyacrylic acid salt) flocculating agent.

When the fluoroplastic particles are dispersed in the aramid pulp-fluoroplastic dispersion by using a cationic surfactant, there is used, as the flocculating agent, a base, a strong electrolyte, a polyacrylamide type flocculating agent, or a polymer (e.g. polymethacrylic acid ester) flocculating agent.

When the fluoroplastic particles are dispersed in the aramid pulp-fluoroplastic dispersion by using a non-ionic surfactant, there is used, as the flocculating agent, a strong electrolyte or a polyacrylamide type polymer flocculating agent.

In adding the flocculating agent to the aramid pulp-fluoroplastic dispersion, it is preferred to add an alkali component such as calcium hydroxide, ammonia or the like to adjust the pH of the aramid pulp-fluoroplastic dispersion in a range of 3.5 to 6.0.

The above-mentioned flocculating agents may be used in combination.

Preferably, substantially the total amount of the fluoroplastic particles present in the aramid pulp-fluoroplastic dispersion is deposited on the aramid pulp. The fluoroplastic particles not deposited on the aramid pulp are washed away into the waste water during sheeting. Since the fluoroplastic is expensive, the washing-away of fluoroplastic into waste water is not preferred economically. Further, the washing-away of fluoroplastic into waste water needs a treatment for waste water, inviting an increase in production cost. That is, "substantially the total amount" refers to an extent in which no waste water treatment is required.

A carbon-based conductive material is added to the aramid pulp-fluoroplastic dispersion. The addition of the carbon-based conductive material may be before or after the deposition of fluoroplastic particles on aramid pulp. The compounding of the carbon-based conductive material in the aramid pulp-fluoroplastic dispersion may be conducted by compounding a dispersion of carbon-based conductive material in an aramid pulp-fluoroplastic dispersion, or after compounding the carbon-based conductive material in an aramid pulp-fluoroplastic dispersion and making the whole a dispersion. Thereby can be obtained a slurry containing an aramid pulp, a carbon-based conductive material and a fluoroplastic deposited on the aramid pulp (this slurry may be hereinafter referred simply as "slurry").

The compounding ratio of the aramid pulp and the carbon-based conductive material is set appropriately depending upon the final product intended. The compounding ratio of the aramid pulp and the carbon-based conductive material (the aramid pulp/carbon-based conductive material) is preferably 90/10 to 10/90, particularly preferably 85/15 to 15/85, in terms of mass ratio. When the aramid pulp/carbon-based conductive material is smaller than 10/90, the reinforcement of the obtained conductive sheet by the aramid pulp is insufficient. When the aramid pulp/carbon-based conductive material is larger than 90/10, the reinforcement of the obtained conductive sheet by the conductive sheet is insufficient.

The above-mentioned disappearing material may be mixed in the slurry.

The compounding ratio of the aramid pulp and the disappearing material is set appropriately depending upon the final product intended. The compounding ratio of the aramid pulp and the disappearing material (the aramid pulp/disappearing material) is preferably 95/5 to 40/60, particularly preferably 70/30 to 50/50, in terms of mass ratio. When the aramid pulp/disappearing material is larger than 95/5, the gas permeability of the sheet obtained is insufficient and the diffusibility of fuel gas or liquid fuel and the water-exhausting property are hardly improved. Meanwhile, when the aramid pulp/disappearing material is smaller than 40/60, the reinforcement of the conductive sheet by the aramid pulp is insufficient.

The compounding of the disappearing material in the slurry may be conducted by compounding a dispersion of the disappearing material in the slurry, or by compounding the disappearing material in the slurry and making the mixture a dispersion.

A filler (e.g. graphite or bronze powder), an additive, etc. may be compounded in the slurry in order to allow the obtained sheet to have a higher property and other property.

Next, the slurry is subjected to sheeting, to obtain a conductive sheet precursor. The sheeting is conducted by known method. For example, there can be used a Fourdrinier machine or a cylinder machine. The conductive sheet precursor obtained is subjected as necessary to dehydration and drying.

Next, the conductive sheet precursor is hot-pressed in the air. The hot-pressing allows the conductive sheet precursor to have conductivity. The temperature of the hot-pressing is 120 to 250° C., preferably 140 to 230° C., particularly preferably 160 to 200° C. The contact pressure during the hot-pressing is 0.1 to 50 MPa, preferably 1 to 30 MPa, particularly preferably 5 to 20 MPa. The time of the hot-pressing is 1 to 300 minutes, preferably 2.5 to 60 minutes, particularly preferably 5 to 30 minutes. The hot-pressing may be conducted continuously or batch-wise.

The hot-pressed conductive sheet precursor has conductivity in the thickness direction of the sheet, owing to the presence of the carbon-based conductive material. However, in this hot-pressed conductive sheet precursor, the fluoroplastic is deposited on the aramid pulp merely in a particle state. Therefore, the hot-pressed conductive sheet precursor has insufficient hydrophobicity.

Next, the hot-pressed conductive sheet precursor is sintered in an inert gas. Thereby, the fluoroplastic particles deposited on the aramid pulp are melted and fused to the surface of the aramid pulp. As a result, a conductive sheet of the present invention having hydrophobicity is obtained. The temperature of the sintering is required to be at least the melting point of the fluoroplastic. The sintering temperature is specifically 200 to 500° C., preferably 230 to 430° C. With a sintering temperature of lower than 200° C., the fluoroplastic particles deposited on the aramid pulp are not melted and the sheet obtained has insufficient hydrophobicity. With a sintering temperature exceeding 500° C., the fluoroplastic is decomposed, generating hydrofluoric acid and inviting inconveniences of production equipment, etc.

The time of the sintering is 10 to 120 minutes, preferably 30 to 90 minutes.

The sintering of the conductive sheet may be conducted while applying a surface pressure thereto. The surface pressure is 1.0 kPa or less, preferably 0.1 to 0.5 kPa. The surface pressure is applied using, for example, a batch press, an intermittent press, a calender press, a belt press, or a roller.

(Use of Present Conductive Sheet)

The present conductive sheet is used preferably as electrode materials for fuel cell, such as gas diffusion electrode for polymer electrolyte fuel cell, electrode for bio fuel cell, and the like. The sheet is used particularly preferably as a gas diffusion electrode for solid polymer fuel cell.

Second Embodiment

The second embodiment of the present invention is explained below.

(Conductive Sheet)

FIG. 1 is a side view showing an example of the conductive sheet of the second embodiment of the present invention.

The conductive sheet 100 of the present embodiment is constituted by comprising an aromatic polyamide pulp, a fluoroplastic and a carbon-based conductive material. The carbon-based conductive material is dispersed between the fibers of the aromatic polyamide pulp. This carbon-based conductive material allows the conductive sheet 100 to have conductivity in the thickness direction. The fluoroplastic is fused to the fiber surfaces of the aromatic polyamide pulp. This fluoroplastic allows the conductive sheet 100 to have hydrophobicity.

The amount of the fluoroplastic present on the surface of the conductive sheet 100 is different between the first surface 12 (one surface) of the conductive sheet 100 and the second surface 14 (opposite to the first surface 12) of the conductive sheet 100. As a result, hydrophobicity is different between the first surface 12 of the conductive sheet 100 and the second surface 14 of the conductive sheet 100.

In the present invention, hydrophobicity is evaluated by the static contact angle of water measured by the method described later (hereinafter, this angle may be referred merely as "contact angle"). A larger contact angle gives higher hydrophobicity.

A surface of conductive sheet, showing a contact angle of at least 100° shows high hydrophobicity and low water-holding property. When such a conductive sheet is used as an electrode material for fuel cell, the polymer electrolyte membrane is dried and tends to cause dry-out, resulting in low cell performance particularly under low-temperature humidity conditions. A surface of conductive sheet, showing a contact angle of smaller than 100° shows low hydrophobicity and high water-holding property. When such a conductive sheet is used as an electrode material for fuel cell, flooding tends to appear even under low-temperature humidity conditions, resulting in low cell performance.

The contact angle of the first surface 12 of the conductive sheet 100 is larger than the contact angel of the second surface 14 of the conductive sheet 100. That is, the first surface 12, as compared with the second surface 14, shows high hydrophobicity and low water-holding property. The second surface 14, as compared with the first surface 12, shows low hydrophobicity and high water-holding property. The difference in contact angle between the first surface 12 and the second surface 14 is 20 to 180°, preferably 35 to 180°. When the difference is smaller than 20°, there is no contribution to the improvement in the efficiency of electricity generation. Such a conductive sheet is not the conductive sheet of the second embodiment of the present invention having hydrophobicity and water-holding property.

The contact angle of the first surface 12 is preferably 100 to 150°, particularly preferably 120 to 150°. With a contact angle of smaller than 100°, flooding appears even under low-temperature humidity conditions and, accordingly, the cell constituted by using such a sheet as an electrode material shows low performance.

The contact angle of the second surface 14 is smaller tan the contact angle of the first surface 12. The difference between the contact angle of the first surface 12 and the contact angle of the second surface 14 is as mentioned previously. The contact angle of the second surface 14 is preferably 50 to 130°, particularly preferably 80 to 130°. When the static contact angle of water is 50° or more, flooding hardly occurs not only under a low-temperature humidity condition of about 45° C. but also under a high-temperature humidity condition of about 70° C. Therefore, a cell constituted by using this sheet as an electrode material shows high performance under high-temperature humidity conditions.

The preferred thickness, basis weight and density of the conductive sheet of the second embodiment of the present invention are the same values as explained in the first embodiment of the present invention.

The electrical resistance between the first surface 12 and the second surface 14 both of the conductive sheet of the second embodiment of the present invention is preferably 3,000 mΩ/cm$^2$ or less, particularly preferably 1,500 mΩ/cm$^2$ or less. With an electrical resistance between the two surfaces, exceeding 3,000 mΩ/cm$^2$, it is difficult to obtain high electricity-generating performance.

Figure 2:
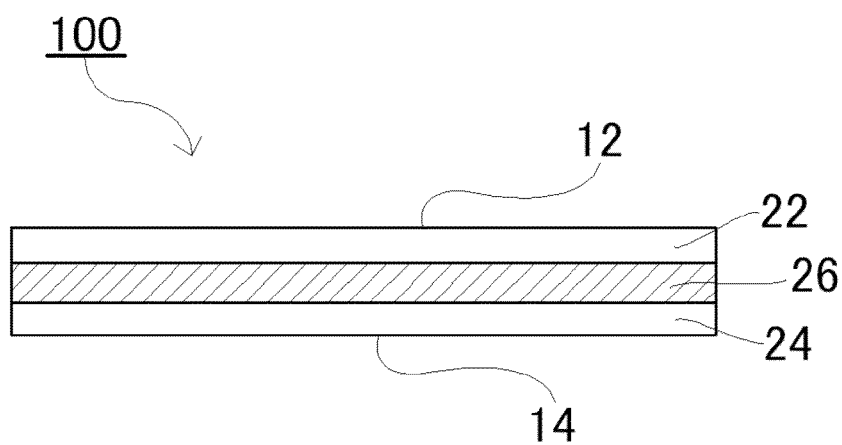
FIG. 2 is a side view showing other example of the conductive sheets of the second and third embodiments of the present invention.

The conductive sheet 100 of the second embodiment of the present invention has a laminated structure of two or more layers, as shown in FIG. 2. At the two ends of the lamination direction, there are present a layer 22 forming the first surface 12 of the conductive sheet and a layer 24 forming the second surface 14 of the conductive sheet. An intermediate layer 26 is formed between the layer 22 and the layer 24.

Each layer is constituted by comprising at least one member of an aromatic polyamide (component A), a fluoroplastic (component B) and a carbon-based conductive material (component C). The layer 22 forming the first surface 12 of the conductive sheet is constituted by comprising at least the component A and the component B. The layer 24 forming the second surface 14 of the conductive sheet is constituted by comprising at least the component C.

The contents of the component A, the component B and the component C are each different between the layer 22 and the layer 24. In the layer 22 forming the first surface 12 of the conductive sheet, the content of the component A is 12.5 to 50 mass %, the content of the component B is 12.5 to 50 mass %, and the content of the component C is 0 to 75 mass %. In the layer 24 forming the second surface 14 of the conductive sheet, the content of the component A is 0 to 33 mass %, the content of the component B is 0 to 33 mass %, and the content of the component C is 34 to 100 mass %. The content of the component B in the layer 22 is higher than the content B in the layer 24. Accordingly, hydrophobicity and water-holding property are each different between the layer 22 and the layer 24. The conductive sheet 100 constituted by using such layers 22 and 24 can have a first surface 12 of high hydrophobicity and a second surface 14 of high water-holding property.

The contents of the component A, the component B and the component C each constituting the intermediate layer 26 may take any values which are between those of the layer 22 and the layer 24.

When the content of the component B (fluoroplastic) of the layer 22 forming the first surface 12 is lower than 12.5 mass % or when the content of the component B of the layer 24 forming the second surface 14 is higher than 33 mass %, there is no large difference in hydrophobicity between the layer 22 and the layer 24. That is, when the content of the component B of the layer 22 is lower than 12.5 mass %, the layer 22 shows low hydrophobicity similarly to the layer 24. As a result, it is impossible to sufficiently exhaust the water formed by the reaction of fuel cell. When the content of the component B of the layer 24 exceeds 33 mass %, the layer 24 shows high hydrophobicity similarly to the layer 22. As a result, the polymer electrolyte membrane layer tends to cause dry-out.

Explanation is made below on each constituent component used in the second embodiment of the present invention.
(Carbon-Based Conductive Material)

The carbon-based conductive material used in the conductive sheet of the second embodiment of the present invention is the same as the above-mentioned carbon-based conductive material used in the first embodiment.
(Aromatic Polyamide Pulp)

The aromatic polyamide pulp used in the conductive sheet of the second embodiment of the present invention is the same as the above-mentioned aromatic polyamide pulp used in the first embodiment.
(Fluoroplastic)

The fluoroplastic used in the conductive sheet of the second embodiment of the present invention is the same as the above-mentioned fluoroplastic used in the first embodiment.
(Method for Production of Conductive Sheet of Second Embodiment)

The method for production of the conductive sheet of the present invention is not particularly restricted. The conductive sheet can be produced, for example, by the following method. In this production method, there is explained a case of producing a conductive sheet shown in FIG. 1.

First, two kinds of slurries (slurry I and slurry II) different in the content of fluoroplastic are prepared. Then, the slurry I and the slurry II are subjected to multi-layer sheeting to obtain a conductive sheet precursor. Then, the conductive sheet precursor is hot-pressed and sintered under given conditions, whereby can be produced a conductive sheet of the present invention. The multi-layer sheeting gives no joint between the layers.

The slurry I and the slurry II can be prepared in the same manner as for the above-mentioned slurries of the first embodiment, except for the following points.

In the slurry I, it is preferable that the compounding ratio of the component A is 12.5 to 50 mass %, the compounding ratio of the component B is 12.5 to 50 mass %, and the compounding ratio of the component C is 0 to 75 mass %. The compounding ratio of the component B is particularly preferably 20 to 50 mass %.

In the slurry II, it is preferable that the compounding ratio of the component A is 0 to 33 mass %, the compounding ratio of the component B is 0 to 33 mass %, and the compounding ratio of the component C is 34 to 100 mass %. The compounding ratio of the component B is more preferably 4 to 10 mass %.

The slurry I and the slurry II may be prepared simultaneously, or either of them may be prepared first.

When an intermediate layer 26 of FIG. 2 is formed, there is prepared, besides the slurry I and the slurry II, a slurry for formation of intermediate layer, whose fluoroplastic content is between those of the slurry I and the slurry II.

The slurry I, the slurry II (these are essential slurries) and, as necessary, the slurry for formation of intermediate layer are subjected to multi-layer sheeting, to obtain a conductive sheet precursor. The multi-layer sheeting is conducted by a known method. It can be conducted using, for example, a Fourdrinier machine or a cylindrical machine. When a conductive sheet having an intermediate layer is produced, the slurry for intermediate layer formation is subjected to sheeting between the sheeting of the slurry I and the sheeting of the slurry II. The conductive sheet precursor obtained is as necessary dehydrated and dried.

Next, the conductive sheet precursor is hot-pressed in the air. The temperature of the hot-pressing is 120 to 250° C., preferably 140 to 230° C., particularly preferably 160 to 200° C. The contact pressure during the hot-pressing is 0.1 to 100 MPa, preferably 1 to 30 MPa, particularly preferably 5 to 20 MPa. The time of the hot-pressing is 1 to 300 minutes, preferably 2.5 to 60 minutes, particularly preferably 5 to 30 minutes. The hot-pressing may be conducted continuously or batch-wise.

The hot-pressing allows the conductive sheet precursor to have conductivity in the thickness direction of the sheet. However, in this hot-pressed conductive sheet precursor, the fluoroplastic is deposited on the aramid pulp merely in a particle state. Therefore, the hot-pressed conductive sheet precursor has insufficient hydrophobicity.

Next, the hot-pressed conductive sheet precursor is sintered in an inert gas. Thereby, the fluoroplastic particles deposited on the aramid pulp are melted and fused to the aramid pulp. As a result, a conductive sheet of the present invention having hydrophobicity is obtained. The temperature of the sintering is required to be at least the melting point of the fluoroplastic. The specific sintering temperature, sintering time and surface pressure employed are the same as explained in the first embodiment.
(Use of Conductive Sheet of Present Invention)

The conductive sheet of the second embodiment of the present invention has hydrophobicity and water-holding property. Therefore, the conductive sheet of the second embodiment of the present invention has a function of exhausting the water formed in cell reaction and a function of suppressing the dry-out of electrolyte membrane, and is suitable as an electrode material for fuel cell. Accordingly, the conductive sheet of the second embodiment of the present invention is preferably used in gas diffusion electrode for polymer electrolyte fuel cell, electrode for bio fuel cell, electrode for air zinc cell, etc. The sheet is used particularly preferably in gas diffusion electrode for polymer electrolyte fuel cell. As the fuel, there are mentioned, for example, an organic compound (e.g. methanol or ethanol) and hydrogen.

Third Embodiment

The third embodiment of the present invention is explained below.
(Conductive Sheet)
The conductive sheet in the third embodiment of the present invention is explained using FIG. 1.

The conductive sheet 100 of the present embodiment comprises an aromatic polyamide pulp, a fluoroplastic and a carbon-based conductive material. The carbon-based conductive material is dispersed between the fibers of the aromatic polyamide pulp and allows the conductive sheet 100 to have conductivity in the thickness direction of the sheet. The fluoroplastic is fused to the fibers of the aromatic polyamide pulp and allows the conductive sheet 100 to have hydrophobicity. The contents of the aromatic polyamide pulp, the fluoroplastic and the carbon-based conductive material are each different between the first surface 12 (one surface) of the conductive sheet 100 and the second surface 14 (other surface opposite to the first surface 12). Accordingly, water infiltrability differs between the first surface 12 and the second surface 14, of the conductive sheet.

In the present invention, the water infiltrability is evaluated by the injection pressure of water, measured by a method described later. In the present invention, the injection pressure of water refers to a pressure required to infiltrate water into the sheet. A larger injection pressure of water is interpreted to indicate lower infiltrability of water, i.e. higher water-blocking property.

A conductive sheet having a water injection pressure of smaller than 20 kPa has high water infiltrability, i.e. low water-blocking property. When such a conductive sheet is used as an electrode material for fuel cell, dry-out (drying of electrolyte membrane) appears, resulting in reduced cell performance particularly under low-temperature humidity conditions. Meanwhile, a conductive sheet having a water injection pressure exceeding 50 kPa has a high-density structure and, accordingly, low permeability for fuel gas. As a result, the amount of the fuel gas fed to the catalyst layer is small, resulting in reduced cell performance.

In the conductive sheet 100 of the present invention, the injection pressure of water at the second surface 14 is larger than the injection pressure of water at the first surface 12. That is, the first surface 12, as compared with the second surface 14, has high water infiltrability and has a function of exhausting the infiltrated water to outside the system. The difference in water injection pressure between the first surface 12 and the second surface 14 is 20 to 50 kPa. With a difference of smaller than 20 kPa, there is no contribution to the improvement in electricity generation efficiency which is an aim of the present invention. Such a conductive sheet is not the conductive sheet of the present invention having both water-blocking property and water-exhausting property.

The second surface 14 is a surface to which water-blocking property is imparted. The water injection pressure thereof is preferably 20 to 50 kPa. With a water injection pressure of smaller than 20 kPa, dry-out appears under low-temperature humidity conditions, resulting in reduced cell performance.

The first surface 12 is a surface to which water-exhausting property is imparted. The water injection pressure thereof is preferably 1 kPa or more. With a water injection pressure of smaller than 1 kPa, flooding appears, resulting in reduced voltage. Further, the water injection pressure of the first surface 12 is smaller than that of the second surface 14.

The preferred thickness, basis weight, and density of the conductive sheet of the third embodiment of the present invention are the same values as previously explained in the first embodiment.

The electrical resistance between the first surface 12 and the second surface 14, of the conductive sheet of the third embodiment of the present invention is preferably 3,000 $m\Omega/cm^2$ or less, particularly preferably 1,500 $m\Omega/cm^2$ or less. A fuel cell constituted using, as the electrode material, a sheet having an electrical resistance between the two surfaces, exceeding 3,000 $m\Omega/cm^2$ hardly gives high electricity-generating performance.

The conductive sheet 100 of the third embodiment of the present invention has a laminated structure of two or more layers, as shown in FIG. 2. At the two ends of the sheet, in the lamination direction, there are present a layer 22 forming the first surface 12 of the conductive sheet and a layer 24 forming the second surface 14 of the conductive sheet. A symbol 26 shown between the layer 22 and the layer 24 is an intermediate layer. The intermediate layer 26 may be constituted by a plurality of layers, or may not be present.

The conductive sheet 100 comprises an aromatic polyamide (hereinafter may be referred as "component A"), a fluoroplastic (hereinafter may be referred as "component B") and a carbon-based conductive material (hereinafter may be referred as "component C"). The layer 22 forming the first surface 12 of the conductive sheet comprises at least the component B and the component C. The layer 24 forming the second surface 14 comprises at least the component B and the component C.

By, in the above-mentioned given content ranges of the components, making the content of the component B in the layer 22 lower than the content of the component B in the layer 24, there are formed, in the conductive sheet 100, a first surface 12 and a second surface 14, which are different in water injection pressure. In the layer 22, the content of the component A is 0 to 45 mass %, the content of the component B is 1 to 45 mass %, and the content of the component C is 10 to 99 mass %. In the layer 24, the content of the component A is 0 to 30 mass %, the content of the component B is 10 to 50 mass %, and the content of the component C is 20 to 90 mass %. By, in the above-mentioned given content ranges of the components, making the content of the component B in the layer 22 lower than the content of the component B in the layer 24, there are formed, in the conductive sheet 100, a first surface 12 and a second surface 14, which are different in water injection pressure. Thus, there can be obtained a conductive sheet 100 having both water-blocking property and water-exhausting property.

A first surface 12 and a second surface 14, which are different in water injection pressure, can be formed in the conductive sheet 100, also by, in the above-mentioned given content ranges of the components, making different the content or the kind of the component C in the layer 22, from the content or the kind of the component C in the layer 24.

The contents of the components A to C in the intermediate layer 26 may each take any value between those in the layer 22 and the layer 24.

When the content of the component B, the content of the component C and the kind of the component C in the layer 22 are each equal to the content of the component B, the content of the component C and the kind of the component C in the layer 24, there appears no difference in water injection pressure between the first surface 12 and the second surface 14.

When the component A in the layer 22 exceeds 45 mass %, there is a tendency that the electrical resistance is higher and the cell performance is lower. When the component B in the layer 22 is lower than 1 mass %, the hydrophobicity is lower and the water formed in the reaction of fuel cell can not be blocked sufficiently.

When the component A in the layer 24 exceeds 30 mass % there is a tendency that no sufficient water-blocking property is obtained. When the component B in the layer 24 is lower than 10 mass %, the hydrophobicity is lower and the water formed in the reaction of fuel cell can not be blocked sufficiently. Meanwhile, when the component B exceeds 50 mass %, the component B is present in a filmy state, resulting in lower gas permeability and reduced cell performance.

When the component C in the layer 24 is lower than 20 mass %, there is a tendency that sufficient conductivity or water-blocking property is difficult to obtain. When the component C in the layer 24 exceeds 90 mass %, there is a tendency that sufficient strength or hydrophobicity is difficult to obtain.

Each constituent component used in the third embodiment of the present invention is explained below.
(Carbon-Based Conductive Material)

The carbon-based conductive material used in the conductive sheet of the third embodiment of the present invention is the same as the above-mentioned carbon-based conductive material used in the first embodiment of the present invention.
(Aromatic Polyamide Pulp)

The aromatic polyamide pulp used in the conductive sheet of the third embodiment of the present invention is the same as the above-mentioned aromatic polyamide pulp used in the first embodiment of the present invention.
(Fluoroplastic)

The fluoroplastic used in the conductive sheet of the third embodiment of the present invention is the same as the above-mentioned fluoroplastic used in the first embodiment of the present invention.
(Method for Production of Conductive Sheet of Third Embodiment)

The production method of the conductive sheet of the third embodiment of the present invention (the sheet may be hereinafter referred as "present conductive sheet") is not particularly restricted. The sheet can be produced, for example, by the following method. In the production method, there is explained a case of producing a conductive sheet shown in FIG. 1.

First, two kinds of slurries (slurry I and slurry II) different in the content of fluoroplastic, the content of carbon-based conductive material or the kind of carbon-based conductive material are prepared. Then, the slurry I and the slurry II are subjected to multi-layer sheeting to obtain a conductive sheet precursor. Then, the conductive sheet precursor is hot-pressed and sintered under given conditions, whereby can be produced a conductive sheet of the present invention. The multi-layer sheeting gives no joint between the layers.

The slurry I and the slurry II can be prepared in the same manner as for the above-mentioned slurries of the first or second embodiment, except for the following points.

In the slurry I, it is preferable that the compounding ratio of the component A is 0 to 45 mass %, the compounding ratio of the component B is 1 to 45 mass %, and the compounding ratio of the component C is 10 to 99 mass %.

The slurry II contains, as the components, at least a fluoroplastic and a carbon-based conductive material. In the slurry II, the contents of the aromatic polyamide pulp, the fluoroplastic and the carbon-based conductive material are preferably 0 to 30 mass %, 10 to 50 mass % and 20 to 90 mass %, respectively. The content of the fluoroplastic in the slurry II is preferably different from the content of the fluoroplastic in the slurry I. By subjecting the slurries different in fluoroplastic content to sheeting, there can be produced a conductive sheet having a surface of high water-blocking property and a surface of high water-exhausting property.

Production of a conductive sheet having a surface of high water-blocking property and a surface of high water-exhausting property is possible also when the kind or amount of the carbon-based conductive material in the slurry I is different from the kind or amount of the carbon-based conductive material in the slurry II.

The slurry I and the slurry II may be prepared simultaneously, or either of them may be prepared first.

The component ratio (excluding water) of the slurry I and the component ratio (excluding water) of the slurry II are substantially the same as the component ratio of the first surface and the component ratio of the second surface, of the conductive sheet, respectively.

When an intermediate layer 26 of FIG. 2 is formed, there is prepared, besides the slurry I and the slurry II, a slurry for formation of intermediate layer, whose fluoroplastic content is between those of the slurry I and the slurry II.

The slurry I, the slurry II (these are essential slurries) and, as necessary, the slurry for formation of intermediate layer are subjected to multi-layer sheeting, to obtain a conductive sheet precursor. The multi-layer sheeting is conducted by a known method. It can be conducted using, for example, a Fourdrinier machine or a cylindrical machine. When a conductive sheet having an intermediate layer is produced, the slurry for intermediate layer formation is subjected to sheeting between the sheeting of the slurry I and the sheeting of the slurry II. The conductive sheet precursor obtained is as necessary dehydrated and dried.

Next, the conductive sheet precursor is hot-pressed in the air. The temperature of the hot-pressing is 120 to 250° C., preferably 140 to 230° C., particularly preferably 160 to 200° C. The contact pressure during the hot-pressing is 0.1 to 100 MPa, preferably 1 to 50 MPa, particularly preferably 5 to 20 MPa. The time of the hot-pressing is 1 to 300 minutes, preferably 2.5 to 60 minutes, particularly preferably 5 to 30 minutes. The hot-pressing may be conducted continuously or batch-wise.

The hot-pressing allows the conductive sheet precursor to have conductivity in the thickness direction of the sheet. However, in this hot-pressed conductive sheet precursor, the fluoroplastic is deposited on the aramid pulp merely in a particle state. Therefore, the hot-pressed conductive sheet precursor has insufficient hydrophobicity.

Next, the hot-pressed conductive sheet precursor is sintered in an inert gas. Thereby, the fluoroplastic particles deposited on the aramid pulp are melted and fused to the aramid pulp. As a result, a conductive sheet of the present invention having hydrophobicity is obtained.

The temperature of the sintering is required to be at least the melting temperature of the fluoroplastic. The specific sintering temperature, sintering time and surface pressure employed are the same as explained in the first embodiment.
(Use of Conductive Sheet of Present Invention)

The conductive sheet of the third embodiment of the present invention has both of hydrophobicity for improved exhaust ability of formed water and water-blocking property for prevention of dry-out of electrolyte membrane, both required for electrode material for fuel cell. Accordingly, the conductive sheet of the third embodiment is preferably used in gas diffusion electrode for polymer electrolyte fuel cell, electrode for bio fuel cell, electrode for air zinc cell, etc. The sheet is used more preferably in gas diffusion electrode for polymer electrolyte fuel cell. As the fuel, there are mentioned, for example, an organic compound (e.g. methanol or ethanol) and hydrogen.

EXAMPLES

The present invention is specifically explained below by way of Examples. However, the present invention is not restricted to these Examples.

Measurements and evaluations of properties were made by the following methods.

[Basis Weight]

A 10 cm×10 cm square sheet was heated at 120° C. for 1 hour, and basis weight of the sheet was calculated from the mass before and after the heating.

[Thickness]

The thickness of a sheet is a thickness obtained when a load of 1.2 N (61.9 kPa) was applied to the sheet in the thickness direction of the sheet, using a circular pressure plate of 5 mm in diameter. The thickness is expressed as an average of the measurements obtained when the surface of a 10 cm×10 cm square sheet was divided into 9 square areas (that is, 9 areas each of about 3.33 cm×3.33 cm) and the thickness of each area at its center was measured.

(Electrical Resistance Between Two Surfaces)

A 50 mm×50 mm square conductive sheet was put between two square gold-plated electrodes of 50 mm×50 mm (thickness: 10 mm). In this case, the conductive sheet and the electrodes were piled up so that the sides of the conductive sheet and the sides of the electrode corresponded to each other. A load of 1 MPa was applied to the conductive sheet in the thickness direction of the sheet using the two electrodes and, in this state, the electrical resistance R (Ω) of the conductive sheet was measured. The electrical resistance between two surfaces was calculated based on the electrical resistance R and the measurement area.

(Average Pore Diameter)

Average pore diameter was measured based on JIS K 3832 "Testing methods for bubble point of membrane filters". In the measurement, there was used a palm porometer [produced by PMI (Porous Material, Inc.), brand name: CFP-1100 AEX]. Pore distribution of a sheet was measured by the bubble point method, using the wet flow amount and the dry flow amount. Volume-average pore diameter was calculated from the pore distribution.

[Gas Permeability]

Gas permeability was measured based on JS K 3832 "Testing methods for bubble point of membrane filters". In the measurement, there was used a palm porometer [produced by PMI (Porous Material, Inc.), brand name: CFP-1100 AEX]. A gas permeation amount per 1 $cm^2$ at a pressure of 100 mm $H_2O$ in the measurement of dry flow amount was taken as gas permeability.

[Average Particle Diameter]

Average particle diameter was measured based on JIS Z 8825-1 "Particle diameter analysis-laser diffraction method". In the measurement, there was used a laser diffraction-scattering type particle size analyzer (produced by Nikkiso Company, Limited, brand name: Microtrac).

[Hydrophobicity]

Hydrophobicity was evaluated by measuring a static contact angle of water. The contact angle was measured as follows. First, 10 ml of distilled water was taken into a micropipette and water drops were formed on the surface of a conductive sheet in 20° C. temperature. The contact angles of the water drops formed on the conductive sheet were measured. In the measurement of contact angle, there was used an optical microscope (produced by KEYENCE Japan, brand name: DIGITAL KICROSCOPE VHX-500). Arbitrarily selected 20 water drops formed on the conductive sheet were measured for contact angle, and an average of these measurements was taken as contact angle.

[Injection Pressure of Water]

Figure 4:
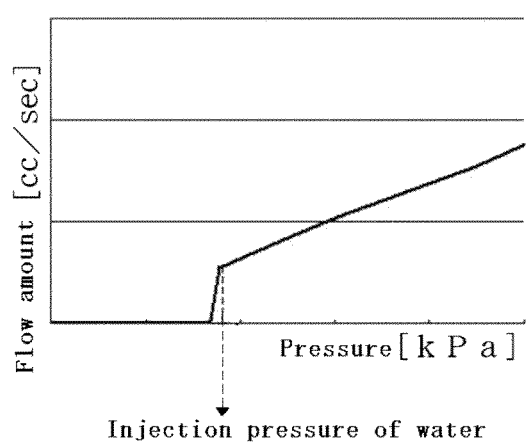
FIG. 4 is a graph showing an example of the injection pressure of water measured using a palm porometer.

A conductive sheet was placed between two ring-shaped jigs each of 2.54 cm in inner diameter and used as a test sample. A water film was formed in one of the two rings, which was on one surface of the test sample. The water film was formed by dropping a distilled water of 50 μl into the above ring using a micro-pipette. A pressure of air (20° C.) was applied to the surface of the test sample on which the water film was formed. The pressurization allows the water film to infiltrate and diffuse into the test sample. As a result, gaps are formed in the water film and air passes through the gaps. In this case, the flow amount of air changes suddenly as shown in FIG. 4. The pressure at this point was taken as injection pressure of water. In the measurement, there was used a palm porometer (produced by PMI, brand name: Automated Capillary Flow Porometer).

[Limiting Current Density]

The second surface of a 50 mm×50 mm square conductive sheet (the surface of smaller hydrophobicity or larger water injection angle) was loaded with 0.2 $mg/cm^2$ of a catalyst (Pt-Rt). To each surface of a polymer electrolyte membrane [Nafion 117 (brand name)] was joined the catalyst-loaded surface (second surface) of the above-prepared, catalyst-loaded conductive sheet, to constitute a cell. Hydrogen gas saturated with water vapor was fed to the anode side of the cell, and air saturated with water vapor was fed to the cathode side of the cell. Setting the fuel utilization ratio of cathode electrode at 40% and the fuel utilization ratio of anode electrode at 70%, fuel performance was measured. As to the cell temperature, the high-temperature humidity condition was set at 70° C. and the low-temperature humidity condition was set at 45° C. The current density at which the cell voltage was 0 V, was taken as limiting current density.

The limiting current density of cell is preferred to be 1,000 $mA/cm^2$ or more in order for the cell to be usable in various applications.

The first embodiment of the present invention is specifically explained below by way of Examples.

Example 1

In deionized water was dispersed 0.97 g (dry mass) of a fibrillated para type aromatic polyamide pulp which was TWARON 1094 (brand name, produced by Teijin Aramid B.V., BET specific surface area: 13.5 $m^2/g$, freeness: 100 ml, length and load-average fiber length: 0.91 mm), followed by stirring, to prepare a dispersion (hereinafter may be referred as "dispersion A-1"). In deionized water was placed, as a non-ionic dispersion of PTFE, 3.20 g (solid content: 1.92 g) of AD 911L (product name, produced by Asahi Glass Co., Ltd., average particle diameter of PTFE: 0.25 μm, PTFE content: 60 mass %), followed by stirring, to prepare a PTFE dispersion (hereinafter may be referred as "dispersion B-1"). The dispersion A-1 and the dispersion B-1 were mixed to flocculate the fluoroplastic on the aramid pulp.

Next, a carbon fiber (produced by TOHO TENAX CO., LTD., average fiber diameter: 7 μm, specific gravity: 1.76) was cut into a length of 3 mm. 1.92 g of the cut carbon fiber was placed in deionized water. Stirring was conducted for 1 minute to prepare a carbon fiber dispersion (hereinafter may be referred as "dispersion C-1").

1.88 g of a carbon black (product name: Ketjen Black EC 600 JD, produced by Lion Corporation, primary particle diameter: 34.0 nm) was placed in deionized water, followed by stirring, to prepare a carbon black dispersion (hereinafter may be referred as "dispersion C-2").

All the dispersions were mixed to obtain a slurry. The slurry was subjected to wet sheeting to obtain a conductive sheet precursor. The conductive sheet precursor was hot-pressed for 10 minutes under the conditions of 200° C. and 500 kgf/cm². Then, the hot-pressed precursor was sintered in a nitrogen atmosphere at 400° C. for 60 minutes to obtain a water-repellent conductive sheet. The conductive sheet had a basis weight of 136 g/m², a thickness of 210 μm, a bulk density of 0.66 g/cm³, an electrical resistance between two surfaces, of 5,800 mΩ/cm², an average pore diameter of 2.6 μm, a gas permeability of 10 ml/min.·cm² and a contact angle of 140°.

Example 2

A dispersion A-1, a dispersion B-1, a dispersion C-1 and a dispersion C-2 were prepared in the same manners as in Example 1. The solid contents in the dispersions are 0.78 g (dispersion A-1), 0.78 g (dispersion B-1), 2.35 g (dispersion C-1) and 2.35 g (dispersion C-2). Then, 2.35 g (solid content) of a linter pulp (decomposition temperature: about 350° C.) as a disappearing material was placed in deionized water, followed by stirring for 3 minutes, to prepare a dispersion (hereinafter may be referred as "dispersion D-1"). Then, the dispersion B-1 and the dispersion C-2 were mixed, followed by stirring. Thereinto was mixed the dispersion A-1 to flocculate the fluoroplastic on the aramid pulp. Thereinto were mixed the dispersion C-1 and the dispersion D-1 in this order, followed by stirring, to obtain a slurry.

The slurry was subjected to wet sheeting, hot-pressing and sintering under the same conditions as in Example 1, to obtain a water-repellent conductive sheet. This sheet had a basis weight of 74 g/m², a thickness of 270 μm, a bulk density of 0.27 g/cm², an electrical resistance between two surfaces, of 3,800 mΩ/cm², an average pore diameter of 4.2 μm, a gas permeability of 650 ml/min.·cm² and a contact angle of 135°.

Example 3

A dispersion A-1 and a dispersion B-1 were prepared in the same manners as in Example 1. The solid contents in the dispersions were 1.56 g (dispersion A-1) and 1.56 g (dispersion B-1). Next, 4.70 g of an artificial graphite SGP (produced by SEC Carbon, average particle diameter: 2.5 μm) was placed in deionized water, followed by stirring for 1 minute, to prepare a dispersion (hereinafter may be referred as "dispersion C-3"). Then, the dispersion C-3 was mixed into the dispersion B-1, the dispersion A-1 was mixed thereinto, and the whole mixture was stirred, whereby the fluoroplastic was flocculated on the aramid pulp to obtain a slurry.

The slurry was subjected to wet sheeting, hot-pressing and sintering under the same conditions as in Example 1 to obtain a water-repellent conductive sheet. The sheet had a basis weight of 69 g/m², a thickness of 180 μm, a bulk density of 0.38 g/cm², an electrical resistance between two surfaces, of 1,000 mΩ/cm², an average pore diameter of 0.1 μm, a gas permeability of 10 ml/min.·cm² and a contact angle of 140°.

Comparative Example 1

A dispersion A-1 and a dispersion B-1 were prepared in the same manners as in Example 1. The solid contents in the dispersions were 3.12 g (dispersion A-1) and 3.12 g (dispersion B-1). The dispersion A-1 and the dispersion B-1 were mixed to flocculate the fluoroplastic on the aramid pulp, whereby a slurry was obtained.

The slurry was subjected to wet sheeting, hot-pressing and sintering under the same conditions as in Example 1 to obtain a sheet. The sheet had a basis weight of 71 g/m², a thickness of 200 μm, a bulk density of 0.36 g/cm³, an electrical resistance between two surfaces, of higher than 20,000 mΩ/cm² or more (unable to measure), an average pore diameter of 0.08 μm, a gas permeability of 2 ml/min.·cm² and a contact angle of 145°.

Comparative Example 2

A dispersion B-1 and a dispersion C-1 were prepared in the same manners as in Example 1. The solid contents in the dispersions were 0.78 g (dispersion B-1) and 2.35 g (dispersion C-1). Next, 2.35 g of a cotton fiber (cut to a length of 3 mm) (decomposition temperature: about 345° C.) was dispersed in deionized water, followed by stirring for 3 minutes, to prepare a dispersion (hereinafter may be referred as "dispersion D-2"). Then, mixing was conducted in the order of the dispersion C-1, the dispersion D-2 and the dispersion B-1 to obtain a slurry.

The slurry was subjected to wet sheeting, hot-pressing and sintering under the same conditions as in Example 1 to obtain a sheet. The sheet had a basis weight of 53 g/m², a thickness of 160 μm, a bulk density of 0.33 g/cm³, an electrical resistance between two surfaces, of 135 mΩ/cm² or more, an average pore diameter of 23.4 μm, a gas permeability of 9,700 ml/min.·cm² and a contact angle of 110°.

Comparative Example 3

3.3 g (mass as dried) of an acrylic pulp (BI-PUL produced by Toyobo Co., Ltd.) was mixed into deionized water to prepare a dispersion A-2. A dispersion B-1, a dispersion C-1 and a dispersion C-2 were prepared in the same manners as in Example 1. The solid contents in the dispersions were 2.6 g (dispersion B-1), 1.0 g (dispersion C-1) and 1.7 g (dispersion C-2). Then, the dispersion B-1 and the dispersion C-2 were mixed, and the dispersion A-2 were mixed thereinto to flocculate the fluoroplastic on the acrylic pulp. Next, the dispersion C-1 was mixed thereinto to obtain a slurry.

The slurry was subjected to wet sheeting, hot-pressing and sintering under the same conditions as in Example 1 to obtain a sheet. The sheet had a basis weight of 60 g/m², a thickness of 170 μm, a bulk density of 0.35 g/cm², an electrical resistance between two surfaces, of 3,500 mΩ/cm² or more, an average pore diameter of 0.2 μm, a gas permeability of 200 ml/min.·cm² and a contact angle of 105°. The sheet generated uneven surface after the sintering.

Comparative Example 4

A dispersion A-1, a dispersion C-1 and a dispersion C-2 were prepared in the same manners as in Example 1. The solid contents in the dispersions were 1.5 g (dispersion A-1), 1.25 g (dispersion C-1) and 1.47 g (dispersion C-2).

Then, mixing was conducted in the order of the dispersion A-1, the dispersion C-1 and the dispersion C-2 to obtain a slurry.

The slurry was subjected to wet sheeting, hot-pressing and sintering under the same conditions as in Example 1 to obtain a sheet. The sheet had a basis weight of 65 g/m², a thickness of 180 μm, a bulk density of 0.36 g/cm², an electrical resistance between two surfaces, of 4,000 mΩ/cm² or more, an average pore diameter of 3 μm, a gas permeability of 500 ml/min.·cm² and a contact angle of 100°.

The properties of the conductive sheets of Examples are shown in Table 1, and the properties of the conductive sheets of Comparative Examples are shown in Table 2.

As shown in Table 1, the conductive sheets of the present invention produced in Examples 1 to 3 are usable as an electrode material for fuel cell. Further, the conductive sheet of the present invention produced in Example 2, as compared with those of Example 1 and Example 3, had a high gas permeability and a large average pore diameter and is particularly preferable as an electrode material for fuel cell.

As shown in Table 2, the sheet produced in Comparative Example 1 had a high electrical resistance between the two surfaces and, therefore, is unusable as an electrode material for fuel cell. The sheet produced in Comparative Example 2 had low hydrophobicity and too large an average pore diameter and, therefore, is not suitable for use as an electrode material for fuel cell.

TABLE 1

| | | | Example 1 | Example 2 | Example 3 |
|---|---|---|---|---|---|
| Component | Dispersion A-1 | | Para type aromatic polyamide pulp | Para type aromatic polyamide pulp | Para type aromatic polyamide pulp |
| | Dispersion A-2 | | — | — | — |
| | Dispersion B-1 | | PTFE | PTFE | PTFE |
| | Dispersion C-1 | | Carbon fiber | Carbon fiber | — |
| | Dispersion C-2 | | Carbon black | Carbon black | — |
| | Dispersion C-3 | | — | — | Graphite particles |
| | Dispersion D-1 (decomposition temp.) | | — | Linter pulp (about 350° C.) | — |
| | Dispersion D-2 | | — | — | — |
| Sintering temperature | | ° C. | 400 | 400 | 400 |
| Basis weight | | g/m² | 136 | 74 | 69 |
| Thickness | | μm | 210 | 270 | 180 |
| Bulk density | | g/cm³ | 0.66 | 0.27 | 0.38 |
| Electrical resistance between two surfaces | | mΩ/cm² | 5800 | 3800 | 1000 |
| Gas permeability | | ml/min.·cm² | 10 | 650 | 10 |
| Average pore diameter | | μm | 2.6 | 4.2 | 0.1 |
| Contact angle | | ° | 140 | 135 | 140 |

TABLE 2

| | | | Comparative Example 1 | Comparative Example 2 | Comparative Example 3 | Comparative Example 4 |
|---|---|---|---|---|---|---|
| Component | Dispersion A-1 | | Para type aromatic polyamide pulp | — | — | Para type aromatic polyamide pulp |
| | Dispersion A-2 | | — | — | Acrylic pulp | — |
| | Dispersion B-1 | | PTFE | PTFE | PTFE | — |
| | Dispersion C-1 | | — | Carbon fiber | Carbon fiber | Carbon fiber |
| | Dispersion C-2 | | — | — | Carbon black | Carbon black |
| | Dispersion C-3 | | — | — | — | — |
| | Dispersion D-1 | | — | — | — | — |
| | Dispersion D-2 (decomposition temp.) | | — | Cotton fiber (about 345° C.) | — | — |
| Sintering temperature | | ° C. | 400 | 400 | 400 | 400 |
| Basis weight | | g/m² | 71 | 53 | 60 | 65 |
| Thickness | | μm | 200 | 160 | 170 | 180 |
| Bulk density | | g/cm³ | 0.36 | 0.33 | 0.35 | 0.36 |
| Electrical resistance between two surfaces | | mΩ/cm² | 20000 or more (unable to measure) | 135 | 3500 | 4000 |
| Gas permeability | | ml/min.·cm2 | 2 | 9700 | 200 | 500 |
| Average pore diameter | | μm | 0.08 | 23.4 | 0.2 | 3 |
| Contact angle | | ° | 145 | 110 | 105 | 100 |
| Remarks | | | | | uneven surface appeared. | |

The sheet produced in Comparative Example 3 had low hydrophobicity because of no fusion of fluoroplastic and is unusable as an electrode material for fuel cell. Further, there was melting of acrylic pulp and shrinkage during the sintering, which caused uneven surface of the sheet. Therefore, the sheet is unusable as an electrode material for fuel cell.

The sheet produced in Comparative Example 4 contained no fluorine and, therefore, showed low hydrophobicity and is unusable as an electrode material for fuel cell.

The second embodiment of the present invention is specifically explained below by way of Examples.

Example 4

(1) Preparation of Dispersions for Slurry I

In deionized water was dispersed 0.44 g (dry mass) of a fibrillated para type aromatic polyamide pulp which was TWARON 1094 (brand name, produced by Teijin Aramid B.

V., BET specific surface area: 13.5 m²/g, freeness: 100 ml, length and load-average fiber length: 0.91 mm), followed by stirring, to prepare an aramid pulp dispersion (hereinafter may be referred as "dispersion A-3").

In deionized water was placed, as a non-ionic dispersion of PTFE, 0.52 g (solid content: 0.31 g) of AD 911L (product name, produced by Asahi Glass Co., Ltd., average particle diameter of PTFE: 0.25 μm, PTFE content: 60 mass %), followed by stirring, to prepare a PTFE dispersion (hereinafter may be referred as "dispersion B-2").

0.44 g (solid content) of a carbon black (product name: Ketjen Black EC 300 JD, produced by Lion Corporation, primary particle diameter: 34.0 nm) was placed in deionized water, followed by stirring, to prepare a dispersion (hereinafter may be referred as "dispersion C-4").

A carbon fiber (produced by TOHO TENAX CO., LTD., average fiber diameter: 7 μm, specific gravity: 1.76) was cut into a length of 3 mm. 1.69 g (solid content) of the cut carbon fiber was placed in deionized water. Stirring was conducted for 1 minute to prepare a carbon fiber dispersion (hereinafter may be referred as "dispersion C-5").

(2) Preparation of Slurry I

The dispersion B-2 and the dispersion C-4 were mixed, followed by stirring for 15 minutes. To the mixed dispersion was added the dispersion A-3, followed by stirring for 20 minutes, to flocculate the fluoroplastic on the aramid pulp. The dispersion C-5 was added, followed by stirring for 3 minutes, to prepare a slurry I. The slurry I is used for production of a sheet which forms the first surface of a conductive sheet of the present invention.

(3) Preparation of Dispersions for Slurry II

In the same manners as in (1) were prepared a dispersion A-4 in which TWARON 1094 (dry mass: 0.44 g) was dispersed, a dispersion B-3 in which 0.21 g (solid content) of AD 911L was dispersed, a dispersion C-6 in which 0.44 g (solid content: 0.13 g) of Ketjen Black EC 300JD was dispersed, and a dispersion C-7 in which 1.69 g (solid content) of a carbon fiber cut into a length of 3 mm was dispersed.

(4) Preparation of Slurry II

The dispersions prepared in (3) were mixed in the same manners as in (2) to prepare a slurry II. The slurry II is used for production of a sheet which forms the second surface of a conductive sheet of the present invention.

(5) Production of Conductive Sheet

The slurry I and the slurry II were subjected to ordinary two-layer wet sheeting to obtain a conductive sheet precursor. The conductive sheet precursor was hot-pressed for 10 minutes under the conditions of 200° C. and 20 MPa. The hot-pressed conductive sheet precursor was sintered in a nitrogen gas atmosphere at 400° C. for 60 minutes to obtain a conductive sheet.

Example 5

Dispersions were prepared in the same manners as in Example 4. The solid contents in the dispersions were 0.50 g (dispersion A-3), 0.38 g (dispersion B-2), 0.50 g (dispersion C-4), 1.50 g (dispersion C-5), 0.50 g (dispersion A-4), 0.50 g (dispersion C-6) and 1.50 g (dispersion C-7). There was no preparation of dispersion B-3.

The dispersions were subjected to wet sheeting, hot-pressing and sintering in the same manners as in Example 4, to obtain a conductive sheet.

Example 6

Dispersions were prepared in the same manners as in Example 4. The solid contents in the dispersions were 0.38 g (dispersion A-3), 0.15 g (dispersion B-2), 1.88 g (dispersion C-4), 0.50 g (dispersion A-4), 0.03 g (dispersion B-3), 0.50 g (dispersion C-6) and 1.50 g (dispersion C-7). There was no preparation of dispersion C-5.

The dispersions were subjected to wet sheeting, hot-pressing and sintering in the same manners as in Example 4, to obtain a conductive sheet.

Example 7

Dispersions were prepared in the same manners as in Example 4. The solid contents in the dispersions were 0.50 g (dispersion A-3), 0.50 g (dispersion B-2), 2.00 g (dispersion C-4), 0.50 g (dispersion A-4), 0.25 g (dispersion B-3) and 2.00 g (dispersion C-7). None of dispersion C-5 and dispersion C-6 was prepared.

The dispersions were subjected to wet sheeting, hot-pressing and sintering in the same manners as in Example 4, to obtain a conductive sheet.

Example 8

Dispersions were prepared in the same manners as in Example 4. The solid contents in the dispersions were 0.50 g (dispersion A-3), 0.63 g (dispersion B-2), 2.00 g (dispersion C-5), 0.50 g (dispersion A-4), 0.25 g (dispersion B-3), 0.50 g (dispersion C-6) and 1.50 g (dispersion C-7). There was no preparation of dispersion C-4.

The dispersions were subjected to wet sheeting, hot-pressing and sintering in the same manners as in Example 4, to obtain a conductive sheet.

Example 9

Dispersions were prepared in the same manners as in Example 4. The solid contents in the dispersions were 0.50 g (dispersion A-3), 0.69 g (dispersion B-2), 2.00 g (dispersion C-5), 0.50 g (dispersion A-4), 0.50 g (dispersion C-6) and 1.50 g (dispersion C-7). None of dispersion B-3 and dispersion C-4 was prepared.

The dispersions were subjected to wet sheeting, hot-pressing and sintering in the same manners as in Example 4, to obtain a conductive sheet.

Example 10

Dispersions were prepared in the same manners as in Example 4. The solid contents in the dispersions were 0.50 g (dispersion A-3), 0.75 g (dispersion B-2), 2.00 g (dispersion C-5), 0.50 g (dispersion C-6) and 1.50 g (dispersion C-7). None of dispersion A-4, dispersion B-3 and dispersion C-4 was prepared.

The dispersions were subjected to wet sheeting, hot-pressing and sintering in the same manners as in Example 4, to obtain a conductive sheet.

Example 11

Dispersions were prepared in the same manners as in Example 4. The solid contents in the dispersions were 0.50 g (dispersion A-3), 0.25 g (dispersion B-2), 2.00 g (dispersion C-5), 0.56 g (dispersion B-3) and 2.00 g (dispersion C-6). None of dispersion A-4, dispersion C-7 and dispersion C-4 was prepared.

The dispersions were subjected to wet sheeting, hot-pressing and sintering in the same manners as in Example 4, to obtain a conductive sheet.

Example 12

Dispersions were prepared in the same manners as in Example 4. The solid contents in the dispersions were 0.50 g (dispersion A-3), 0.22 g (dispersion B-2), 0.50 g (dispersion C-4), 1.50 g (dispersion C-5), 0.50 g (dispersion A-4), 0.50 g (dispersion C-6) and 1.5 g (dispersion C-7). There was no preparation of dispersion B-3.

The dispersions were subjected to wet sheeting, hot-pressing and sintering in the same manners as in Example 4, to obtain a conductive sheet.

Reference Example 1

Dispersions were prepared in the same manners as in Example 4. The solid contents in the dispersions were 0.75 g (dispersion A-3), 0.94 g (dispersion B-2), 0.88 g (dispersion C-4) and 2.56 g (dispersion C-5). There was no preparation of slurry II.

The dispersions were subjected to wet sheeting, hot-pressing and sintering in the same manners as in Example 4, to obtain a conductive sheet.

Reference Example 2

Dispersions were prepared in the same manners as in Example 4. The solid contents in the dispersions were 0.63 g (dispersion A-3), 0.13 g (dispersion B-2), 0.94 g (dispersion C-4) and 2.81 g (dispersion C-5). There was no preparation of slurry II.

The dispersions were subjected to wet sheeting, hot-pressing and sintering in the same manners as in Example 4, to obtain a conductive sheet.

Comparative Example 5

Dispersions were prepared in the same manners as in Example 4. The solid contents in the dispersions were 0.94 g (dispersion B-2), 2.00 g (dispersion C-4), 0.25 g (dispersion B-3) and 2.00 g (dispersion C-7). None of dispersion A-3, dispersion C-5, dispersion A-4 and dispersion C-6 was prepared.

The dispersions were subjected to wet sheeting, hot-pressing and sintering in the same manners as in Example 4. However, no conductive sheet precursor could be produced owing to insufficient sheet strength.

Comparative Example 6

Dispersions were prepared in the same manners as in Example 4. The solid contents in the dispersions were 0.75 g (dispersion B-2), 0.50 g (dispersion C-4), 1.50 g (dispersion C-5), 0.31 g (dispersion B-3) and 2.00 g (dispersion C-7). None of dispersion A-3, dispersion A-4 and dispersion C-6 was prepared.

The dispersions were subjected to wet sheeting, hot-pressing and sintering in the same manners as in Example 4. However, no conductive sheet precursor could be produced owing to insufficient sheet strength.

Comparative Example 7

Dispersions were prepared in the same manners as in Example 4. The solid contents in the dispersions were 0.63 g (dispersion B-2), 0.50 g (dispersion C-4), 1.50 g (dispersion C-5), 0.50 g (dispersion C-6) and 1.5 g (dispersion C-7). None of dispersion A-3, dispersion A-4 and dispersion B-3 was prepared.

The dispersions were subjected to wet sheeting, hot-pressing and sintering in the same manners as in Example 4. However, no conductive sheet precursor could be produced owing to insufficient sheet strength.

Comparative Example 8

Dispersions were prepared in the same manners as in Example 4. The solid contents in the dispersions were 0.50 g (dispersion B-2), 0.50 g (dispersion C-4), 1.50 g (dispersion C-5), 0.25 g (dispersion B-3), 0.50 g (dispersion C-6) and 1.5 g (dispersion C-7). None of dispersion A-3 and dispersion A-4 was prepared.

The dispersions were subjected to wet sheeting, hot-pressing and sintering in the same manners as in Example 4. However, no conductive sheet precursor could be produced owing to insufficient sheet strength.

Reference Example 3

Dispersions were prepared in the same manners as in Example 4. The solid contents in the dispersions were 0.50 g (dispersion A-3), 0.50 g (dispersion B-2), 0.50 g (dispersion C-4), 1.50 g (dispersion C-5), 0.50 g (dispersion A-4), 0.31 g (dispersion B-3), 0.50 g (dispersion C-6) and 1.5 g (dispersion C-7).

The dispersions were subjected to wet sheeting, hot-pressing and sintering in the same manners as in Example 4, to obtain a conductive sheet.

The properties of the conductive sheets of Examples, Reference Examples and Comparative Examples are shown in Tables 3 to 6.

The conductive sheets obtained in Examples 4 to 12 had each a limiting current density under the low-temperature humidity condition, of 1,000 mA/cm$^2$ or more. Therefore, these conductive sheets are suitable as an electrode material for fuel cell. The conductive sheets of Examples 4 and 6 to 8 also showed a limiting current density under the high-temperature humidity condition, of 1,000 mA/cm$^2$ or more and, therefore, are suitable also as an electrode material for fuel cell used under the high-temperature humidity condition.

The conductive sheets obtained in Examples 4 to 10 and 12 showed an electrical resistance between two surfaces, of 3,000 mΩ/cm$^2$ or less and, therefore, contribute particularly to the improvement in electricity-generating performance of fuel cell.

With respect to the balance between hydrophobicity and water-holding property, conductive sheets obtained in Examples 4, 7 and 8 are preferred. In the conductive sheets of Examples 4 and 7, the difference between the contact angle at the first surface and the contact angle at the second surface was 35°. In the conductive sheet of Example 8, the difference in contact angle was 30°. In these conductive sheets, the water formed in cell reaction could be exhausted sufficiently and the dry-out of the polymer electrolyte membrane could be prevented.

The conductive sheet obtained in Reference Example 1 showed a contact angle of 135° at each of the first surface and the second surface and showed high hydrophobicity at the two surfaces. Therefore, the limiting current density was 1,000 mA/cm² or less under the low-temperature humidity condition where water-holding property was necessary.

The conductive sheet obtained in Reference Example 2 showed a contact angle of 95° at each of the first surface and the second surface and showed low hydrophobicity at the two surfaces. Therefore, flooding appears easily not only under the high-temperature humidity condition but also under the low-temperature humidity condition. The limiting current density was 1,000 mA/cm² or less under the high-temperature humidity condition and the low-temperature humidity condition.

As to the conductive sheets obtained in Comparative Examples 5 to 8, no para type aromatic polyamide pulp was used. Therefore, each conductive sheet precursor was insufficient in strength and allowed for no sheeting.

The conductive sheet obtained in Reference Example 3 showed a contact angle exceeding 100° at each of the first surface and the second surface and high hydrophobicity at the two surfaces. Therefore, the limiting current density was 1,000 mA/cm² or less under the low-temperature humidity condition.

TABLE 3

|  |  | Example 4 | Example 5 | Example 6 | Example 7 |
|---|---|---|---|---|---|
| First surface | Dispersion A-3 component | Para type aromatic polyamide pulp | Para type aromatic polyamide pulp | Para type aromatic polyamide pulp | Para type aromatic polyamide pulp |
|  | Amount fed (g/m²) | 7 | 8 | 6 | 8 |
|  | Dispersion B-2 component | PTFE | PTFE | PTFE | PTFE |
|  | Amount fed (g/m²) | 5 | 6 | 2.5 | 8 |
|  | Dispersion C-4 component | Ketjen black | Ketjen black | Ketjen black | Ketjen black |
|  | Amount fed (g/m²) | 7 | 8 | 30 | 32 |
|  | Dispersion C-5 component | Carbon fiber | Carbon fiber | — | — |
|  | Amount fed(g/m²) | 27 | 24 | — | — |
| Second surface | Dispersion A-4 component | Para type aromatic polyamide pulp | Para type aromatic polyamide pulp | Para type aromatic polyamide pulp | Para type aromatic polyamide pulp |
|  | Amount fed (g/m²) | 7 | 8 | 8 | 8 |
|  | Dispersion B-3 component | PTFE | — | PTFE | PTFE |
|  | Amount fed (g/m²) | 2 | — | 0.5 | 4 |
|  | Dispersion C-6 component | Ketjen black | Ketjen black | Ketjen black | — |
|  | Amount fed (g/m²) | 7 | 8 | 8 | — |
|  | Dispersion C-7 component | Carbon fiber | Carbon fiber | Carbon fiber | Carbon fiber |
|  | Amount fed (g/m²) | 27 | 24 | 24 | 32 |
| Basis weight (g/m²) |  | 73 | 69 | 71 | 69 |
| Average thickness (μm) |  | 230 | 200 | 200 | 260 |
| Electrical resistance between two surfaces (mΩ/cm²) |  | 1350 | 1550 | 1050 | 2100 |
| Contact angle | First surface (°) | 135 | 135 | 100 | 140 |
|  | Second surface(°) | 100 | 0 (infiltrated) | 55 | 105 |
| Limiting current density under high-temperature humidity condition (mA/cm²) |  | 1380 | 320 | 1200 | 1020 |
| Limiting current density under low-temperature humidity condition (mA/cm²) |  | 1090 | 1110 | 1150 | 1010 |

TABLE 4

|  |  | Example 8 | Example 9 | Example 10 | Example 11 |
|---|---|---|---|---|---|
| First surface | Dispersion A-3 component | Para type aromatic polyamide pulp | Para type aromatic polyamide pulp | Para type aromatic polyamide pulp | Para type aromatic polyamide pulp |
|  | Amount fed (g/m²) | 8 | 8 | 8 | 8 |
|  | Dispersion B-2 component | PTFE | PTFE | PTFE | PTFE |
|  | Amount fed (g/m2) | 10 | 11 | 12 | 4 |
|  | Dispersion C-4 | — | — | — | — |

TABLE 4-continued

|  |  | Example 8 | Example 9 | Example 10 | Example 11 |
|---|---|---|---|---|---|
|  | component |  |  |  |  |
|  | Amount fed (g/m$^2$) | — | — | — | — |
|  | Dispersion C-5 component | Carbon fiber | Carbon fiber | Carbon fiber | Carbon fiber |
|  | Amount fed (g/m$^2$) | 32 | 32 | 32 | 32 |
| Second surface | Dispersion A-4 component | Para type aromatic polyamide pulp | Para type aromatic polyamide pulp | — | — |
|  | Amount fed (g/m$^2$) | 8 | 8 | — | — |
|  | Dispersion B-3 component | PTFE | — | — | PTFE |
|  | Amount fed (g/m$^2$) | 4 | — | — | 9 |
|  | Dispersion C-6 component | Ketjen black | Ketjen black | Ketjen black | Ketjen black |
|  | Amount fed (g/m$^2$) | 8 | 8 | 8 | 32 |
|  | Dispersion C-7 component | Carbon fiber | Carbon fiber | Carbon fiber | — |
|  | Amount fed (g/m$^2$) | 24 | 24 | 24 | — |
| Basis weight (g/m$^2$) |  | 71 | 65 | 60 | 62 |
| Average thickness (μm) |  | 190 | 200 | 310 | 260 |
| Electrical resistance between two surfaces (mΩ/cm$^2$) |  | 1700 | 1800 | 2900 | 5500 |
| Contact angle | First surface (°) | 140 | 145 | 145 | 135 |
|  | Second surface (°) | 110 | 0 (infiltrated) | 0 (infiltrated) | 105 |
| Limiting current density under high-temperature humidity condition (mA/cm$^2$) |  | 1380 | 660 | 780 | 980 |
| Limiting current density under low-temperature humidity condition (mA/cm$^2$) |  | 1010 | 1050 | 1030 | 1000 |

TABLE 5

|  |  | Example 12 | Reference Example 1 | Reference Example 2 | Comparative Example 5 |
|---|---|---|---|---|---|
| First Surface | Dispersion A-3 component | Para type aromatic polyamide pulp | Para type aromatic polyamide pulp | Para type aromatic polyamide pulp | — |
|  | Amount fed (g/m$^2$) | 8 | 12 | 10 | — |
|  | Dispersion B-2 component | PTFE | PTFE | PTFE | PTFE |
|  | Amount fed (g/m$^2$) | 3.5 | 15 | 2 | 15 |
|  | Dispersion C-4 component | Ketjen black | Ketjen black | Ketjen black | Ketjen black |
|  | Amount fed (g/m$^2$) | 8 | 14 | 15 | 32 |
|  | Dispersion C-5 component | Carbon fiber | Carbon fiber | Carbon fiber | — |
|  | Amount fed (g/m$^2$) | 24 | 41 | 45 | — |
| Second Surface | Dispersion A-4 component | Para type aromatic polyamide pulp | — | — | — |
|  | Amount fed (g/m$^2$) | 8 | — | — | — |
|  | Dispersion B-3 component | — | — | — | PTFE |
|  | Amount fed (g/m$^2$) | — | — | — | 4 |
|  | Dispersion C-6 component | Ketjen black | — | — | — |
|  | Amount fed (g/m$^2$) | 8 | — | — | — |
|  | Dispersion C-7 component | Carbon fiber | — | — | Carbon fiber |
|  | Amount fed (g/m$^2$) | 24 | — | — | 32 |
| Basis weight (g/m$^2$) |  | 64 | 65 | 69 | — |
| Average thickness (μm) |  | 290 | 220 | 180 | — |
| Electrical resistance between two surfaces (mΩ/cm$^2$) |  | 1900 | 1100 | 1050 | — |
| Contact angle | First surface (°) | 95 | 135 | 95 | — |
|  | Second surface (°) | 0 (infiltrated) | 135 | 95 | — |

TABLE 5-continued

|  | Example 12 | Reference Example 1 | Reference Example 2 | Comparative Example 5 |
|---|---|---|---|---|
| Limiting current density under high-temperature humidity condition (mA/cm$^2$) | 560 | 1390 | 650 | — |
| Limiting current density under low-temperature humidity condition (mA/cm$^2$) | 1020 | 920 | 860 | — |
| Remarks |  | Single layer | Single layer | Sheeting was impossible. |

TABLE 6

|  |  | Comparative Example 6 | Comparative Example 7 | Comparative Example 8 | Reference Example 3 |
|---|---|---|---|---|---|
| First Surface | Dispersion A-3 component | — | — | — | Para type aromatic polyamide pulp |
|  | Amount fed (g/m$^2$) | — | — | — | 8 |
|  | Dispersion B-2 component | PTFE | PTFE | PTFE | PTFE |
|  | Amount fed (g/m$^2$) | 12 | 10 | 8 | 8 |
|  | Dispersion C-4 component | Ketjen black | Ketjen black | Ketjen black | Ketjen black |
|  | Amount fed (g/m$^2$) | 8 | 8 | 8 | 8 |
|  | Dispersion C-5 component | Carbon fiber | Carbon fiber | Carbon fiber | Carbon fiber |
|  | Amount fed (g/m$^2$) | 24 | 24 | 24 | 24 |
| Second Surface | Dispersion A-4 component | — | — | — | Para type aromatic polyamide pulp |
|  | Amount fed (g/m$^2$) | — | — | — | 8 |
|  | Dispersion B-3 component | PTFE | — | PTFE | PTFE |
|  | Amount fed (g/m$^2$) | 5 | — | 4 | 5 |
|  | Dispersion C-6 component | — | Ketjen black | Ketjen black | Ketjen black |
|  | Amount fed (g/m$^2$) | — | 8 | 8 | 8 |
|  | Dispersion C-7 component | Carbon fiber | Carbon fiber | Carbon fiber | Carbon fiber |
|  | Amount fed (g/m$^2$) | 32 | 24 | 24 | 24 |
| Basis weight (g/m$^2$) |  | — | — | — | 70 |
| Average thickness (μm) |  | — | — | — | 310 |
| Electrical resistance between two surfaces (mΩ/cm$^2$) |  | — | — | — | 1800 |
| Contact angle | First surface (°) | — | — | — | 145 |
|  | Second surface (°) | — | — | — | 130 |
| Limiting current density under high-temperature humidity condition (mA/cm$^2$) |  | — | — | — | 1400 |
| Limiting current density under low-temperature humidity condition (mA/cm$^2$) |  | — | — | — | 890 |
| Remarks |  | Sheeting was impossible. | Sheeting was impossible. | Sheeting was impossible. |  |

The third embodiment of the present invention is specifically explained below by way of Examples.

Example 13

(1) Preparation of Dispersions for Slurry I

Into deionized water was mixed a fibrillated para type aromatic polyamide pulp which was TWARON 1094 (brand name, produced by Teijin Aramid B.V., BET specific surface area: 13.5 m$^2$/g, freeness: 100 ml, length and load-average fiber length: 0.91 mm) to prepare a dispersion (hereinafter may be referred as "dispersion A-5").

Into deionized water was mixed, as a non-ionic dispersion of PTFE, AD 911L (product name, produced by Asahi Glass Co., Ltd., average particle diameter of PTFE: 0.25 μm, solid content: 60 mass %) to prepare a dispersion (hereinafter may be referred as "dispersion B-4").

In deionized water was dispersed, as a carbon black (a carbon-based conductive material), Ketjen Black EC 300 JD (product name, produced by Lion Corporation, primary particle diameter: 34.0 nm), followed by stirring, to prepare a dispersion (hereinafter may be referred as "dispersion C-8").

A carbon fiber (produced by TOHO TENAX CO., LTD., average fiber diameter: 7 μm, specific gravity: 1.76) was cut into a length of 3 mm and dispersed in deionized water, followed by stirring for 1 minute, to prepare a dispersion (hereinafter may be referred as "dispersion C-9").

Into deionized water was mixed a carbon milled fibber (produced by TOHO TENAX CO., LTD., average fiber diameter: 7 μm, specific gravity: 1.76, average fiber length: 160 μm) to prepare a dispersion (hereinafter may be referred as "dispersion C-10").

(2) Preparation of Slurry I

The dispersion B-4 and the dispersion C-8 were mixed and stirred for 15 minutes. To the mixed dispersion was added the dispersion A-5, followed by stirring for 20 minutes to deposit the fluoroplastic on the aramid pulp. Thereto was added the dispersion C-9, followed by stirring for 3 minutes to obtain a slurry I. The component amounts in the slurry I were 0.75 g (dispersion A-5 component), 0.50 g (dispersion B-4 component), 1.90 g (dispersion C-8 component) and 1.38 g (dispersion C-9 component). The slurry I is to form a layer having the first surface of a conductive sheet of the present invention.

(3) Preparation of Slurry II

Dispersions were mixed in the same manners as in the slurry I to prepare a slurry II. The component amounts in the dispersions for slurry II were 0.50 g (dispersion B-4 component) and 1.31 g (dispersion C-8 component). The slurry II is to form a layer having the second surface of a conductive sheet of the present invention.

(5) Production of Conductive Sheet

The slurry I and the slurry II were subjected to two-layer sheeting to obtain a conductive sheet precursor. The conductive sheet precursor was hot-pressed for 10 minutes under the conditions of 200° C. and 20 MPa. Then, the hot-pressed conductive sheet precursor was sintered in a nitrogen gas atmosphere at 400° C. for 60 minutes to obtain a conductive sheet. The properties of the conductive sheet and the fed amount and content of each component in the layers constituting the first surface and the second surface are shown in Table 7.

Example 14

A slurry I and a slurry II were prepared in the same manners as in Example 13. The component amounts in the dispersions for slurry I were 0.38 g (dispersion A-5 component), 0.25 g (dispersion B-4 component), 0.94 g (dispersion C-8 component) and 0.69 g (dispersion C-9 component). The component amounts in the dispersions for slurry II were 0.38 g (dispersion A-5 component), 0.75 g (dispersion B-4 component), 0.50 g (dispersion C-8 component) and 0.19 g (dispersion C-10 component). The two slurries were subjected to wet sheeting, hot-pressing and sintering in the same manners as in Example 1 to obtain a conductive sheet. The properties of the conductive sheet and the fed amount and content of each component in the layers constituting the first surface and the second surface are shown in Table 7.

Example 15

A slurry I and a slurry II were prepared in the same manners as in Example 13. The component amounts in the dispersions for slurry I were 0.63 g (dispersion A-5 component), 0.38 g (dispersion B-4 component), 0.94 g (dispersion C-8 component) and 0.31 g (dispersion C-10 component). The component amounts in the dispersions for slurry II were 0.38 g (dispersion B-4 component), 2.81 g (dispersion C-8 component) and 0.31 g (dispersion C-10 component). The two slurries were subjected to wet sheeting, hot-pressing and sintering in the same manners as in Example 13 to obtain a conductive sheet. The properties of the conductive sheet and the fed amount and content of each component in the layers constituting the first surface and the second surface are shown in Table 7.

Example 16

A slurry I and a slurry II were prepared in the same manners as in Example 13. The component amounts in the dispersions for slurry I were 0.50 g (dispersion A-5 component), 0.63 g (dispersion B-4 component) and 1.25 g (dispersion C-9 component). The component amounts in the dispersions for slurry II were 0.50 g (dispersion A-5 component), 0.63 g (dispersion B-4 component) and 1.25 g (dispersion C-8 component). The two slurries were subjected to wet sheeting, hot-pressing and sintering in the same manners as in Example 13 to obtain a conductive sheet. The properties of the conductive sheet and the fed amount and content of each component in the layers constituting the first surface and the second surface are shown in Table 7.

Reference Example 4

Only a slurry I was prepared in the same manner as in Example 13. The component amounts in the dispersions for slurry I were 0.75 g (dispersion A-5 component), 0.50 g (dispersion B-4 component), 1.88 g (dispersion C-8 component) and 1.38 g (dispersion C-9 component). The slurry I was subjected to sheeting and, in the same manners as in Example 13, hot-pressed and sintered, to obtain a conductive sheet. The properties of the conductive sheet and the fed amount and content of each component in the layers constituting the first surface and the second surface are shown in Table 8.

Reference Example 5

A slurry I and a slurry II were prepared in the same manners as in Example 13. The component amounts in the dispersions for slurry I were 0.63 g (dispersion A-5 component), 1.25 g (dispersion B-4 component), 1.44 g (dispersion C-8 component) and 0.19 g (dispersion C-10 component). The component amounts in the dispersions for slurry II were 0.63 g (dispersion A-5 component), 0.94 g (dispersion B-4 component), 0.94 g (dispersion C-8 component) and 0.19 g (dispersion C-10 component). The two slurries were subjected to wet sheeting, hot-pressing and sintering in the same manners as in Example 13 to obtain a conductive sheet. The properties of the conductive sheet and the fed amount and content of each component in the layers constituting the first surface and the second surface are shown in Table 8.

Reference Example 6

A slurry I and a slurry II were prepared in the same manners as in Example 13. The component amounts in the dispersions for slurry I were 0.31 g (dispersion A-5 component) and 1.88 g (dispersion C-9 component). The component amounts in the dispersions for slurry II were 0.38 g (dispersion A-5 component), 0.31 g (dispersion B-4 component) and 0.63 g (dispersion C-8 component). The two slurries were subjected to wet sheeting, hot-pressing and sintering in the same manners as in Example 13 to obtain a conductive sheet. The properties of the conductive sheet and the fed amount and content of each component in the layers constituting the first surface and the second surface are shown in Table 8.

The conductive sheets obtained in Examples 13 to 16 showed each a limiting current density of 1,000 mA/cm$^2$ or more under the low-temperature humidity condition and the high-temperature humidity condition. Therefore, these conductive sheets are preferred as an electrode material for fuel cell.

These conductive sheets also showed each an electrical resistance between two surfaces, of 2,000 mΩ/cm$^2$ or less. Therefore, the sheets contribute particularly to the improvement in electricity-generating performance of fuel cell.

The conductive sheet obtained in Reference Example 4 showed a water injection pressure of 17 kPa at each of the first surface and the second surface. Since the water injection pressure was low at the two surfaces, the limiting current density was 1,000 mA/cm$^2$ or less under the low-temperature humidity condition where water-holding property was required.

The conductive sheet produced in Reference Example 5 showed a difference in water injection pressure of 15 kPa between the first surface and the second surface. Since the water injection pressure was high at each of the two surfaces, the sheet had inferior gas permeability. As a result, the limiting current density was 1,000 mA/cm$^2$ or less under each of the high-temperature humidity condition and the low-temperature humidity condition.

The conductive sheet produced in Reference Example 6 showed a difference in water injection pressure of 18 kPa between the first surface and the second surface. Since the water injection pressure was low at each of the two surfaces, flooding appeared under the high-temperature humidity condition and dry-out appeared under the low-temperature humidity condition. As a result, the limiting current density was 1,000 mA/cm$^2$ or less under each of the high-temperature humidity condition and the low-temperature humidity condition.

TABLE 7

| | | Example 13 | Example 14 | Example 15 | Example 16 |
|---|---|---|---|---|---|
| First surface | Dispersion A-5 component | Para type aromatic polyamide pulp | Para type aromatic polyamide pulp | Para type aromatic polyamide pulp | Para type aromatic polyamide pulp |
| | Amount fed (g/cm$^2$) | 12 | 6 | 10 | 8 |
| | Dispersion B-4 component | PTFE | PTFE | PTFE | PTFE |
| | Amount fed (g/cm$^2$) | 8 | 4 | 6 | 10 |
| | Dispersion C-8 component | Carbon black | Carbon black | Carbon black | — |
| | Amount fed (g/cm$^2$) | 30 | 15 | 15 | — |
| | Dispersion C-9 component | Carbon fiber | Carbon fiber | — | Carbon fiber |
| | Amount fed (g/cm$^2$) | 22 | 11 | — | 20 |
| | Dispersion C-10 component | — | — | Carbon milled fiber | — |
| | Amount fed (g/cm$^2$) | — | — | 5 | — |
| Contents in layer forming first surface (%) | Component A | 17 | 17 | 28 | 21 |
| | Component B | 11 | 11 | 17 | 26 |
| | Component C | 72 | 72 | 55 | 53 |
| Second surface | Dispersion A-5 component | — | Para type aromatic polyamide pulp | — | Para type aromatic polyamide pulp |
| | Amount fed (g/cm$^2$) | — | 6 | — | 8 |
| | Dispersion B-4 component | PTFE | PTFE | PTFE | PTFE |
| | Amount fed (g/cm$^2$) | 8 | 12 | 6 | 10 |
| | Dispersion C-8 component | Carbon black | Carbon black | Carbon black | Carbon black |
| | Amount fed (g/cm$^2$) | 21 | 8 | 45 | 20 |
| | Dispersion C-10 component | — | Carbon milled fiber | Carbon milled fiber | — |
| | Amount fed (g/cm$^2$) | — | 3 | 5 | — |
| Contents in layer forming second surface (%) | Component A | 0 | 21 | 0 | 21 |
| | Component B | 28 | 41 | 11 | 26 |
| | Component C | 72 | 28 | 89 | 53 |
| Contents in total sheet (%) | Component A | 12 | 18 | 11 | 21 |
| | Component B | 16 | 25 | 13 | 26 |
| | Component C | 72 | 57 | 76 | 53 |
| Basis weight (g/cm$^2$) | | 79 | 49 | 72 | 54 |
| Thickness (μm) | | 190 | 210 | 160 | 230 |
| Electrical resistance between two surfaces (mΩ/cm$^2$) | | 420 | 560 | 410 | 650 |
| Injection pressure of water | First surface (kPa) | 17 | 17 | 3 | 12 |
| | Second surface (kPa) | 38 | 40 | 25 | 48 |
| Limiting current | Low-temperature humidity condition | 1080 | 1060 | 1010 | 1050 |

TABLE 7-continued

|  |  | Example 13 | Example 14 | Example 15 | Example 16 |
|---|---|---|---|---|---|
| density | (mA/cm$^2$) |  |  |  |  |
|  | High-temperature humidity condition (mA/cm$^2$) | 1250 | 1210 | 1150 | 1280 |

TABLE 8

|  |  | Reference Example 4 | Reference Example 5 | Reference Example 6 |
|---|---|---|---|---|
| First surface | Dispersion A-5 component | Para type aromatic polyamide pulp | Para type aromatic polyamide pulp | Para type aromatic polyamide pulp |
|  | Amount fed (g/cm$^2$) | 12 | 10 | 5 |
|  | Dispersion B-4 component | PTFE | PTFE | — |
|  | Amount fed (g/cm$^2$) | 8 | 20 | — |
|  | Dispersion C-8 component | Carbon black | Carbon black | — |
|  | Amount fed (g/cm$^2$) | 30 | 23 | — |
|  | Dispersion C-9 component | Carbon fiber | — | Carbon fiber |
|  | Amount fed (g/cm$^2$) | 22 | — | 30 |
|  | Dispersion C-10 component | — | Carbon milled fiber | — |
|  | Amount fed (g/cm$^2$) | — | 3 | — |
| Contents in layer forming first surface (%) | Component A | 17 | 18 | 14 |
|  | Component B | 11 | 36 | 0 |
|  | Component C | 72 | 46 | 86 |
| Second surface | Dispersion A-5 component | — | Para type aromatic polyamide pulp | Para type aromatic polyamide pulp |
|  | Amount fed (g/cm$^2$) | — | 10 | 6 |
|  | Dispersion B-4 component | — | PTFE | PTFE |
|  | Amount fed (g/cm$^2$) | — | 15 | 5 |
|  | Dispersion C-8 component | — | Carbon black | Carbon black |
|  | Amount fed (g/cm$^2$) | — | 15 | 10 |
|  | Dispersion C-10 component | — | Carbon milled fiber | — |
|  | Amount fed (g/cm$^2$) | — | 3 | — |
| Contents in layer forming second surface (%) | Component A | — | 23 | 29 |
|  | Component B | — | 35 | 21 |
|  | Component C | — | 42 | 48 |
| Contents in total sheet (%) | Component A | 17 | 20 | 20 |
|  | Component B | 11 | 35 | 9 |
|  | Component C | 72 | 44 | 71 |
| Basis weight (g/cm$^2$) |  | 55 | 73 | 40 |
| Thickness (μm) |  | 170 | 190 | 160 |
| Electrical resistance between two surfaces (mΩ/cm$^2$) |  | 380 | 350 | 650 |
| Injection pressure of water | First surface (kPa) | 17 | 45 | 0 |
|  | Second surface (kPa) | 17 | 60 | 18 |
| Limiting current density | Low-temperature humidity condition (mA/cm$^2$) | 800 | 830 | 790 |
|  | High-temperature humidity condition (mA/cm$^2$) | 1360 | 750 | 670 |
| Remarks |  |  | Mono-layer structure | — | — |

The invention claimed is:

1. A conductive sheet comprising a fibrillated aromatic polyamide pulp, a fluoroplastic fused to the aromatic polyamide pulp, and a carbon-based conductive material,
    wherein the bulk density of the conductive sheet is 0.2 to 0.7 g/cm$^3$, the average pore diameter of the conductive sheet is 0.1 to 20 μm, and the gas permeability of the conductive sheet is 3 ml/min.·cm$^2$ or higher.

2. The conductive sheet according to claim 1, wherein the carbon-based conductive material is at least one member selected from the group consisting of carbon fiber, carbon black, graphite particles, carbon nanotube, carbon milled fiber, carbon nanofiber, and carbon nanohorn.

3. The conductive sheet according to claim 1, wherein the electrical resistance between the two surfaces is 6,500 mΩ/cm$^2$ or less and the static contact angle of water is 120° or more.

4. A method for producing a conductive sheet according to claim 1, comprising the steps of:
    preparing a slurry containing a fibrillated aromatic polyamide pulp, a fluoroplastic fused to the aromatic polyamide pulp, and a carbon-based conductive material,
    subjecting the slurry to sheeting to obtain a conductive sheet precursor,
    hot-pressing the conductive sheet precursor in air at a temperature of 120 to 250° C. at a contact pressure of 0.1 to 50 MPa for 1 to 300 minutes, then
    sintering the resulting conductive sheet in an inert gas of 200 to 500° C.

5. The method for producing a conductive sheet according to claim 4,
    wherein the slurry further contains a material having a decomposition temperature in an inert atmosphere, lower by at least 30° C. than the sintering temperature in the sintering step conducted later.

6. A conductive sheet comprising a fibrillated aromatic polyamide pulp, a fluoroplastic fused to the aromatic polyamide pulp, and a carbon-based conductive material,
    wherein the bulk density of the conductive sheet is 0.2 to 0.7 g/cm$^3$, the average pore diameter of the conductive sheet is 0.1 to 20 μm, and the gas permeability of the conductive sheet is 3 ml/min.·cm$^2$ or higher,
    wherein the static contact angle of water on a first surface of the conductive sheet is larger than the static contact angle of water on a second surface opposite to the first surface and the difference between the water static contact angle on the first surface and the water static contact angle on the second surface is 20 to 180°.

7. The conductive sheet according to claim 6, wherein the static contact angle of water on the first surface is 100 to 150°.

8. The conductive sheet according to claim 6, wherein the static contact angle of water on the second surface is 50 to 130°.

9. The conductive sheet according to claim 6, wherein the carbon-based conductive material is at least one member selected from the group consisting of carbon fiber, carbon black, graphite particles, carbon nanotube, carbon milled fiber, carbon nanofiber, carbon nanohorn, and graphene.

10. The conductive sheet according to claim 6, wherein the electrical resistance between the two surfaces is 3,000 mΩ/cm² or less.

11. The conductive sheet according to claim 6, having a layered structure of at least two layers in the thickness direction, wherein one outermost layer of the conductive sheet is a layer forming the first surface comprising 12.5 to 50 mass % of a fibrillated aromatic polyamide pulp, 12.5 to 50 mass % of a fluoroplastic, and 0 to 75 mass % of a carbon-based conductive material, other outermost layer of the conductive sheet is a layer forming the second surface comprising 0 to 33 mass % of a fibrillated aromatic polyamide pulp, 0 to 33 mass % of a fluoroplastic, and 34 to 100 mass % of a carbon-based conductive material, and the fluoroplastic content in the layer forming the first surface is higher than the fluoroplastic content in the layer forming the second surface.

12. A method for producing the conductive sheet according to claim 6, comprising the steps of:
preparing a slurry I comprising 12.5 to 50 mass % of a fibrillated aromatic polyamide pulp, 0 to 75 mass % of a carbon-based conductive material and 12.5 to 50 mass % of a fluoroplastic deposited on the aromatic polyamide pulp, and a slurry II comprising a carbon-based conductive material and a fluoroplastic of zero content or a content lower than the fluoroplastic content in the slurry I,
subjecting the slurry I and the slurry II to multi-layer sheeting to obtain a conductive sheet precursor,
hot-pressing the conductive sheet precursor in air at a temperature of 120 to 250° C. at a contact pressure of 0.1 to 100 MPa for 1 to 300 minutes, then
sintering the resulting conductive sheet in an inert gas of 200 to 500° C.

13. A conductive sheet comprising a fibrillated aromatic polyamide pulp, a fluoroplastic fused to the aromatic polyamide pulp, and a carbon-based conductive material,
wherein the bulk density of the conductive sheet is 0.2 to 0.7 g/cm³, the average pore diameter of the conductive sheet is 0.1 to 20 μm, and the gas permeability of the conductive sheet is 3 ml/min.·cm² or higher,
wherein the injection pressure of water on a first surface of the conductive sheet is smaller than the injection pressure of water on a second surface opposite to the first surface and the difference between the injection pressure of water on the first surface and the injection pressure of water on the second surface is 20 to 50 kPa.

14. The conductive sheet according to claim 13, wherein the injection pressure of water on the first surface is 1 kPa or more.

15. The conductive sheet according to claim 13, wherein the injection pressure of water on the second surface is 20 to 50 kPa.

16. The conductive sheet according to claim 13, wherein the carbon-based conductive material is selected from the group consisting of graphite particles, carbon black, carbon nanotube, carbon fiber, carbon milled fiber, carbon nanofiber, carbon nanohorn, and graphene.

17. The conductive sheet according to claim 13, wherein the electrical resistance between the two surfaces is 3,000 mΩ/cm² or less.

18. The conductive sheet according to claim 13, having a layered structure of at least two layers in the thickness direction, wherein one outermost layer of the conductive sheet is a layer forming the first surface comprising 0 to 45 mass % of a fibrillated aromatic polyamide pulp, 1 to 45 mass % of a fluoroplastic, and 10 to 99 mass % of a carbon-based conductive material, and other outermost layer of the conductive sheet is a layer forming the second surface comprising 0 to 30 mass % of a fibrillated aromatic polyamide pulp, 10 to 50 mass % of a fluoroplastic, and 20 to 90 mass % of a carbon-based conductive material.

19. The conductive sheet according to claim 18, wherein the content of the fluoroplastic of the layer forming the second surface is higher than the content of the fluoroplastic of the layer forming the first surface.

20. The conductive sheet according to claim 18, wherein the content of the carbon-based conductive material of the layer forming the second surface is higher than the content of the carbon-based conductive material of the layer forming the first surface.

21. The conductive sheet according to claim 18, wherein the carbon-based conductive material of the layer forming the first surface is different from the carbon-based conductive material of the layer forming the second surface.

22. A method for producing a conductive sheet according to claim 13, which comprises
preparing a slurry I comprising 0 to 45 mass % of a fibrillated aromatic polyamide pulp, 1 to 45 mass % of a fluoroplastic and 10 to 99 mass % of a carbon-based conductive material, and a slurry II comprising 0 to 30 mass % of a fibrillated aromatic polyamide pulp, 10 to 50 mass % of a fluoroplastic and 20 to 90 mass % of a carbon-based conductive material,
subjecting the slurry I and the slurry II to multi-layer sheeting to obtain a conductive sheet precursor,
hot-pressing the conductive sheet precursor in air at a temperature of 120 to 250° C. at a contact pressure of 0.1 to 100 MPa for 1 to 300 minutes, then
sintering the resulting conductive sheet in an inert gas of 200 to 500° C.

23. A fuel cell which is a laminate of
an electrode material using the conductive sheet and an electrolyte membrane,
wherein the electrode material is laminated to the electrolyte membrane in such a way that the second surface of the conductive sheet faces the electrolyte membrane,
wherein the conductive sheet comprises a fibrillated aromatic polyamide pulp, a fluoroplastic fused to the aromatic polyamide pulp, and a carbon-based conductive material,
wherein the bulk density of the conductive sheet is 0.2 to 0.7 g/cm³, the average pore diameter of the conductive sheet is 0.1 to 20 μm, and the gas permeability of the conductive sheet is 3 ml/min.·cm² or higher, and wherein either one or both of the following conditions apply:
(i) the static contact angle of water on a first surface of the conductive sheet is larger than the static contact angle of water on a second surface opposite to the first surface and the difference between the water static contact angle on the first surface and the water static contact angle on the second surface is 20 to 180°;
(ii) the injection pressure of water on a first surface of the conductive sheet is smaller than the injection pressure of water on a second surface opposite to the first surface and the difference between the injection pressure of water on the first surface and the injection pressure of water on the second surface is 20 to 50 kPa.

* * * * *